(12) United States Patent
Palmgren

(10) Patent No.: US 10,023,135 B2
(45) Date of Patent: Jul. 17, 2018

(54) FASTENING DEVICE FOR SECURING ELONGATED VEHICLE COMPONENTS

(71) Applicant: VOLVO TRUCK CORPORATION, Göteborg (SE)

(72) Inventor: Marcel Palmgren, Torslanda (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/524,187

(22) PCT Filed: Nov. 13, 2015

(86) PCT No.: PCT/EP2015/076606
§ 371 (c)(1),
(2) Date: May 3, 2017

(87) PCT Pub. No.: WO2016/007531
PCT Pub. Date: May 19, 2016

(65) Prior Publication Data
US 2017/0355329 A1  Dec. 14, 2017

(30) Foreign Application Priority Data

Nov. 14, 2014 (IN) .......................... 5746/CHE/2014

(51) Int. Cl.
*F16L 3/137* (2006.01)
*B60R 16/02* (2006.01)
(Continued)

(52) U.S. Cl.
CPC .......... *B60R 16/0215* (2013.01); *F16L 3/137* (2013.01); *H02G 3/26* (2013.01); *H02G 3/30* (2013.01); *F16L 3/23* (2013.01)

(58) Field of Classification Search
CPC ........ B60R 16/0215; F16L 3/137; F16L 3/23; H02G 3/26; H02G 3/30
See application file for complete search history.

(56) References Cited

U.S. PATENT DOCUMENTS 3,744,096 A * 7/1973 Kok ....................... B65D 63/14
24/16 PB
3,875,618 A * 4/1975 Schuplin ............ B65D 63/1036
24/16 PB (Continued)

FOREIGN PATENT DOCUMENTS

EP     0756365 A1   1/1997
WO     9509778 A1   4/1995

OTHER PUBLICATIONS

International Search Report (dated Jan. 18, 2016) for corresponding International App. PCT/EP2015/076606.

*Primary Examiner* — Anita M King
(74) *Attorney, Agent, or Firm* — WRB-IP LLP

(57) ABSTRACT

A fastening device is provided for securing a plurality of elongated vehicle components to a first side of a vehicle structural member. The fastening device includes a first elongated strap member configured to form a loop around a first bundle of the elongated vehicle components, and a head member configured to be positioned on a second side of the vehicle structural member opposite the first side. The head member is provided with a through hole configuration for receipt of two portions of the first elongated strap member forming the loop and configured to allow tying of the first elongated strap member from the second side of the vehicle structural member. Moreover, the fastening device includes a second elongated strap member configured to form a loop around a second bundle of the elongated vehicle components. The head member through hole configuration is configured for receipt of two portions of the second elongated strap member forming the loop. In addition, the head member is configured to allow tying of the second elongated strap member from the second side of the vehicle structural member.

18 Claims, 12 Drawing Sheets

(51) Int. Cl.
*H02G 3/00* (2006.01)
*H02G 3/30* (2006.01)
*F16L 3/23* (2006.01)

(56) References Cited

U.S. PATENT DOCUMENTS

| | | | | |
|---|---|---|---|---|
| 4,397,435 | A * | 8/1983 | Fisher | F16L 3/00 24/21 |
| 4,993,669 | A * | 2/1991 | Dyer | B65D 63/16 24/16 PB |
| 5,653,409 | A * | 8/1997 | White, Jr. | F16L 3/137 24/16 PB |
| 9,334,091 | B2 * | 5/2016 | Zantout | B65D 63/00 |
| 2002/0084388 | A1 | 7/2002 | Geiger | |
| 2010/0306967 | A1 | 12/2010 | Geiger | |

* cited by examiner

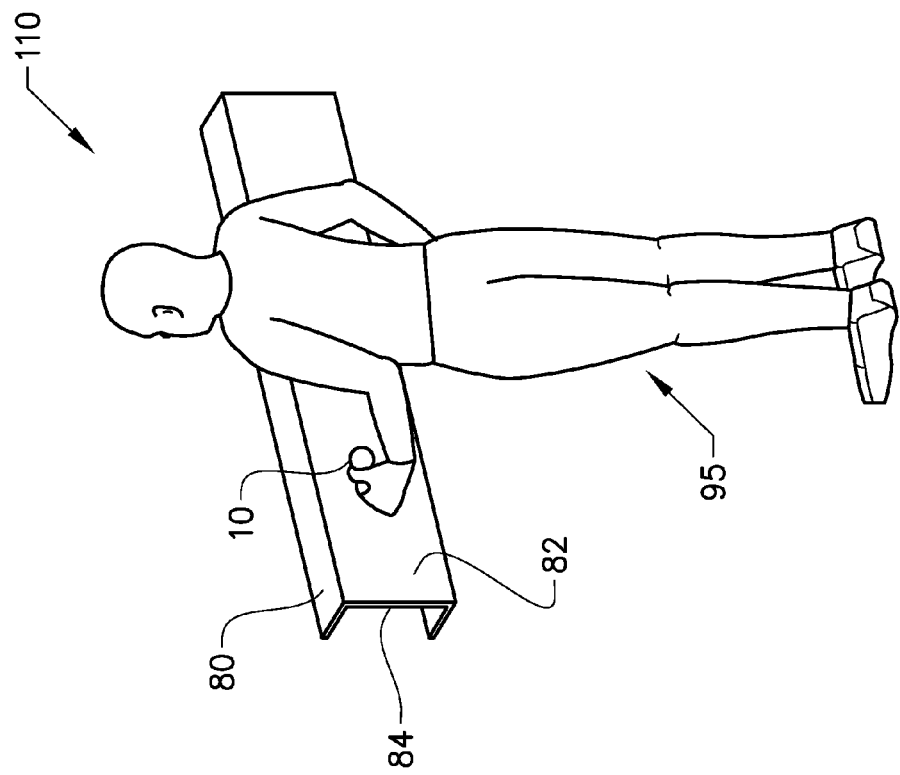
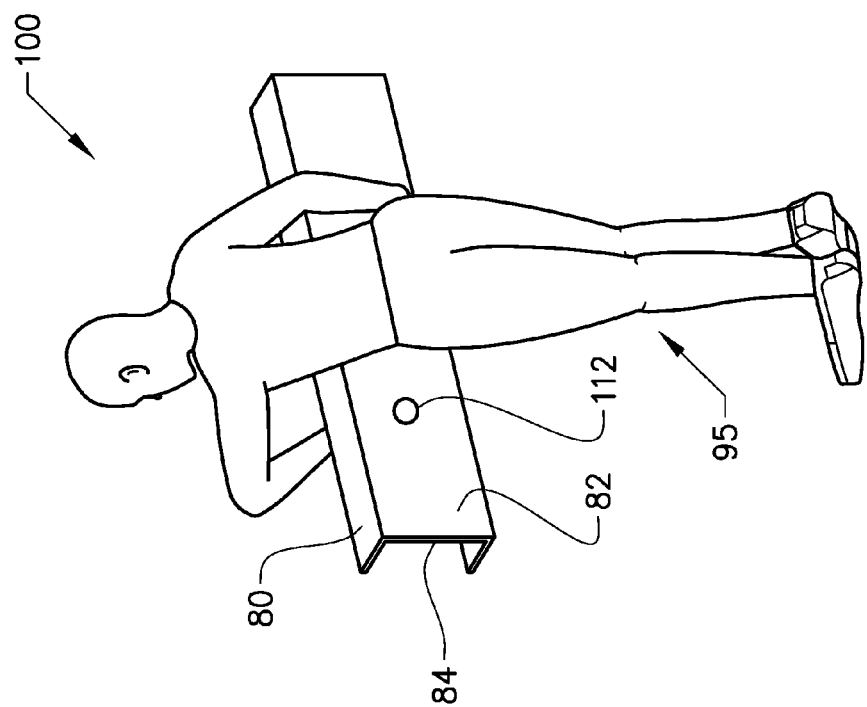

FASTENING DEVICE FOR SECURING ELONGATED VEHICLE COMPONENTS

BACKGROUND AND SUMMARY

The invention relates to a fastening device for securing a plurality of elongated vehicle components to a first side of a vehicle structural member. Furthermore, the invention relates to a vehicle frame assembly comprising a fastening device and a vehicle frame.

In addition, the invention relates to a method for securing a plurality of elongated vehicle components to a vehicle structural member with a fastening device.

The invention can be applied in heavy-duty vehicles, such as trucks, buses and construction equipment. Although the invention will be described in relation to a truck, the invention is not restricted to this particular vehicle, but may also be used in other type of vehicles such as cars, industrial construction machines, wheel loaders, etc.

During assembly of various types of vehicles, there is often a need to retain a group of elongated vehicle components, such as electric cables or wires, bundled to a certain surface of a vehicle structural member. As an example, it may be desirable to secure a bundle of cables to an inner surface of a vehicle frame to avoid that the cables are moving, or rattling, within the vehicle during operation.

One common type of a fastening device for securing a bundle of cables together is an ordinary tie-wrap, which is normally made of nylon. A typical tie-wrap, sometimes denoted as a cable tie, has a strap member portion with serrations that engage with a pawl in the head of the cable tie to form a ratchet. Thereafter, a free end of the strap member section is pulled until the tie-wrap is sufficiently tensioned and does not come undone.

A cable tie tensioning device or tool may be used to apply a cable tie with a specific degree of tension. The tool may further trim the end portion of the strap member in order to avoid a sharp edge which might otherwise cause injury.

Fastening device may be provided in the form of a cable tie having a strap member portion being integral to a head member of the fastening device. Alternatively, the fastening device may be provided in the form of two separate pieces, i.e. a head member and a separate strap member. In this type of fastening devices, the strap member may have a wedge-shaped pawl on one end that locks into the head member when the strap is passed through an aperture in the head member until the wedge is driven downwardly into the aperture of the head member. The shape of the aperture in the head member may typically correspond to the shape of the wedge-shaped pawl of the strap member.

One example of this type of fastening devices is illustrated in U.S. Pat. No. 6,533,226, which discloses an assembly for securing a bundle to a support member including a button head-type tie and a saddle mount. The button head-type tie comprises a button head and an elongated strap with teeth serrations and a wedge-shaped locking pawl at one end. The button head is provided with a central aperture for receiving a portion of the strap. To secure the bundle, the strap is looped around the bundled items and a tail of the strap is passed back into an aperture of the saddle, an aperture in the structural member and the aperture in the button head. When the tail of the strap is reinserted through the saddle mount and into the button head, it is pulled tightly through the button head. This has the effect of drawing the wedge-shaped pawl downwardly into the button head aperture, thereby locking it against the strap. In this manner, the bundle is kept securely fastened to the structural member. After the strap has been tightened, the tail and excess strap length can be trimmed to make a clean installation.

U.S. Pat. No. 6,533,226 further discloses another assembly arrangement including a plurality of bundles positioned in adjacent relationship. In this arrangement, one primary strap is used to secure a primary bundle and the saddle mount to a first side of the support member, while being tensioned from a second side of the support member. Besides that the saddle mount has a primary aperture for receipt of the primary strap, there is provided a set of secondary apertures in the saddle mount for receipt of additional cable ties. In contrast to the primary strap, which is inserted in the saddle mount and the support member, and thereafter tensioned from a second side of the support member, the additional cable ties are inserted in the secondary apertures of the saddle mount, only, and thereafter tensioned from the first side of the support member. This type of arrangement is useful when the mounting assembly is to be used with conventional cable ties in order to secure more than one bundle of items alongside the structural member.

However, even though the above arrangement provides a fastening device for a plurality of bundles of elongated vehicle components, there remains a need for an alternative fastening device, which has improved functionality without increasing the total weight of the fastening device. In particular, it would be desirable to improve the functionally of the fastening device so that several adjacent bundles of cables can be mounted to a vehicle structural member in a fast and ergonomic manner.

It is desirable to provide an improved and simple fastening device for securing a plurality of elongated vehicle components to a first side of a vehicle structural member in a fast and ergonomic manner.

According to a first aspect of the invention, a fastening device is provided.

Thus, according to the first aspect of the invention there is provided a fastening device for securing a plurality of elongated vehicle components to a first side of a vehicle structural member. The fastening device comprises a first elongated strap member configured to form a loop around a first bundle of the elongated vehicle components, and a head member configured to be positioned on a second side of the vehicle structural member opposite the first side. The head member is provided with a through hole configuration for receipt of two portions of the first elongated strap member forming the loop. Moreover, the head member is configured to allow tying of the first elongated strap member from the second side of the vehicle structural member. In addition, the fastening device comprises a second elongated strap member configured to form a loop around a second bundle of the elongated vehicle components. The head member through hole configuration is therefore also configured for receipt of two portions of the second elongated strap member forming the loop. Furthermore, the head member is configured to allow tying of the second elongated strap member from the second side of the vehicle structural member.

In this way, it becomes possible to provide a fastening device, in which each one of the elongated strap members could be tightened from the second side of the vehicle structural member since the head member is configured to be forced against the second side of the vehicle structural member when the set of the elongated strap members are tied from the second side of the vehicle structural member, while the plurality of the elongated vehicle components are secured to the first side of the structural member. Typically, the first side of the structural member refers to an inner side of the structural member while the second side refers to an outer side of the structural member. In an example when the structural member is a vehicle frame, this means that the invention provides a solution in which each one of the elongated strap members could be inserted into one single head member and thereafter tightened from the outside of the vehicle frame in order to secure at least a first bundle of elongated vehicle members and a second bundle of elongated vehicle members to the inner side of the vehicle frame. The outside of the frame, or the outside surface, may herein sometimes be denoted as the outer frame surface, while the inner side of the frame may sometimes be denoted as the inner frame surface.

In contrast to hitherto known fastening devices, which only allows one primary elongated strap member to be tightened from the outside of the vehicle frame, while the additional (secondary) elongated strap members are tightened from the inside of the vehicle frame, the invention enables that the fastening of the elongated vehicle components and the assembly of the fastening device to the vehicle frame can be operated and controlled by a user (e.g. an assembly worker) from the outside of the frame. Thus, the invention overcomes the problem of internal tightening of bundles or tightening the bundles before assembling the complete vehicle frame. To this end, the invention improves the ergonomics for assembly workers in a vehicle production and assembly plant, while ensuring that the assembly of the fastening device to the vehicle frame can be carried out in fast and effective manner.

As a result, the productivity may often increase since an ergonomic workplace may typically have a positive impact on employee efficiency and satisfaction.

In addition, it becomes possible for the user to select whether the first elongated strap member and/or the second elongated strap member should be used to fasten the head member to the vehicle frame since both strap members are configured to be inserted in the through hole configuration of the head member. This is an additional advantage over prior art which relies upon that only the primary elongated strap member is configured to be inserted into the aperture of the vehicle frame and the hole of the head member.

By a configuration according to the invention, the head member is adapted to abut the outside (second) side of the vehicle structural member when the first elongated strap member and the second elongated strap member are tied from the second side of the vehicle structural member after being inserted from atop side of the head member into the through hole configuration, and subsequently being inserted back through the through hole configuration.

Typically, the head member has a top side and an abutment surface for abutting the second side of the vehicle structural member, which abutment surface is on an opposite side of the head member in relation to the top side. Thus, the through hole configuration extends from the top side to the abutment surface for allow tying of the first elongated strap member and the second elongated strap member from the top side of the head member. In this way, the head member is configured to allow tying of the first elongated strap member from the top side of the head member. Analogously, the head member is configured to allow tying of the second, elongated strap member from the top side of the head member.

It is to be noted that the second side here typically refers to the outer surface of the vehicle structural member. The through hole configuration may typically extend from the top side to the abutment surface.

Thus, it becomes possible to provide a fastening device, in which each one of the elongated strap members could be tightened from the top side of the head member, since the head member is configured to be forced against the second side of the vehicle structural member when the set of elongated strap members are tied from the top side of the head member, white the plurality of the elongated vehicle components are secured to the first side of the structural member.

According to one embodiment, the head member is configured to be forced against the second side of the vehicle structural member when the first elongated strap member is tied from the second side of the vehicle structural member, typically corresponding to the same side of the structural member as the top side of the head member. In addition, or alternatively, the head member is configured to be forced against the second side of the vehicle structural member when the second elongated strap member is tied from the second side of the vehicle structural member, typically corresponding to the same side as the top side of the head member. According to another embodiment, the head member is configured to be forced against the second side of the vehicle structural member when the first elongated strap member and the second elongated strap member are tied from the second side of the vehicle structural member, typically corresponding to the same side as the top side of the head member.

According to one embodiment, the head member hole configuration comprises a first through hole adapted to receive the first elongated strap member and a second through hole adapted to receive the second elongated strap member. Hereby, it becomes possible to keep the first elongated member at a distance from the second elongated member so that tying of the elongated strap members is facilitated. Another advantage with this configuration is that the engagement of each elongated strap member to the head member becomes more reliable since each elongated strap member is encircled by the through hole inner surface, only, as seen in a radial cross-sectional view of the head member. Thus, it becomes possible to avoid any direct contact between the elongated strap members in the area of the head member. By this configuration, the head member is adapted to abut the, second (outer surface) of the structural member when the first elongated strap member and the second elongated strap member are tied from the top side of the head member after being inserted from the top side into the first through hole and the second through hole, respectively, and subsequently being inserted back through the first through hole and the second through hole.

According to one embodiment, the head member hole configuration is provided in the form of a single through hole.

The term "vehicle structural member" as used herein may refer, but is not limited, to a vehicle frame, vehicle frame rail, car chassis, engine compartment, fender, flange, body panel, bracket, rear axle installation or the like.

The term "elongated vehicle components" as used herein may refer, but is not limited, to cables, electric cables, hoses, wires or the like.

The term "head member" as used herein may refer, but is not limited, to a button-head member. Thus according to one embodiment, the head member is a button-head member. Typically, although not strictly required, the head member is formed separately and independently from the first and second elongated strap members. Thus, according to one embodiment, the head member is a separate part from the first elongated strap member and the second elongated strap member. However, it should be readily appreciated that in one example embodiment, the head member and any one of the first elongated strap member and the second elongated strap member are integrated components of the fastening device, i.e. the fastening device is provided as one integrated unit.

According to one embodiment, the fastening device comprises a third elongated strap member configured to form a loop around a third bundle of the elongated vehicle components. Thus, the head member is provided with a third through hole. The third hole may typically extend from the top side to the abutment surface. Alternatively, the head member hole configuration is provided with a third through hole extending from the top side to the abutment surface. The third through hole is adapted to receive the third elongated strap member forming the loop. As such, the head member is adapted to abut the second side (outer surface) of the vehicle structural member when the first elongated strap member, the second elongated strap member and/or the third elongated strap member are tied from the second side of the structural member. In other words, the head member is adapted to abut the second side (outer surface) of the vehicle structural member when the first elongated strap member, the second elongated strap member and/or the third elongated strap member are tied from the top side of the head member.

Accordingly, and similar to the configuration with the first and second elongated strap members, the head member is configured to allow tying of the third elongated strap member from the second side of the structural member (or top side of the head member).

According to one embodiment, any one of the first, second and third elongated strap members is provided with a first free leading end and a second end having engagement means for engaging with the head member.

In cases when the elongated vehicle components, e.g. cables, are to be secured at a distance from the first side of structural member, the fastening device may further comprise an intermediate spacer member. Thus according to one embodiment, the fastening device further comprises an intermediate spacer member having opposite first end and second end. In addition, the intermediate spacer member has a passage configuration extending therebetween for receiving at least one of the first and second elongated strap members, wherein the intermediate spacer member is adapted to be disposed in-between the vehicle structural member and the plurality of bundles of vehicle components. Accordingly, it becomes possible to locate and arrange the vehicle components at a distance from other abrasive parts like screws, nuts and sharp edges.

According to one embodiment, the intermediate spacer member passage configuration comprises a first passage adapted to receive the first elongated strap member and a second passage adapted to receive the second elongated strap member. In this manner, it becomes possible to keep the first elongated member at a distance from the second elongated member when they are supported by the intermediate spacer member. As mentioned herein, the separation of the bundles can hereby be made vertically and/or horizontally.

Alternatively, the intermediate spacer member passage configuration is one single passage for receipt of both first and second elongated strap members.

Preferably, the first bundle of the elongated vehicle components is distanced from the second bundle of the elongated vehicle components in a transverse direction of the intermediate spacer member. In addition, or alternatively, the first bundle of the elongated vehicle components is distanced from the second bundle of the elongated vehicle components in a longitudinal direction of the intermediate spacer member. Further, the passage configuration of the intermediate spacer member may typically extend in at least the longitudinal direction X of the intermediate spacer member.

Typically, at least one passage of the first and second passages of the intermediate spacer member extends in at least the longitudinal direction X.

According to one embodiment, the extension of the first passage along the longitudinal direction X is different from the extension of the second passage along the longitudinal direction X. As an example, the first passage may extend a first distance in the longitudinal direction X and the second passage may extend a second distance in the longitudinal direction X. Typically, the first distance is longer than the second distance.

According to one embodiment, the at least one passage of the intermediate spacer member which extends in at least the longitudinal direction X is the first passage, and wherein the second passage is spaced apart from the first passage and extends in at least the longitudinal direction X. According to one embodiment, the at least one passage of the intermediate spacer member which extends in at least the longitudinal direction X is the first passage, and wherein the second passage is spaced apart from the first passage, while a part of the second passage is inclined in relation to the longitudinal direction X.

Preferably, the first and second passages extend in parallel with each other along a substantial part of the extension of the intermediate spacer member in the longitudinal direction X.

In order to enable that the first bundle of the elongated vehicle components is distanced from the second bundle of the elongated vehicle components in a transverse direction to the longitudinal direction of the intermediate spacer member, a part of the at least one passage of the intermediate spacer member is inclined in relation to the longitudinal direction X such that an opening of the passage in the second end is displaced from an opening of the passage in the first end, as seen in a direction perpendicular to the longitudinal direction X.

According to one embodiment when the intermediate spacer member comprises a first passage and a second passage, as mentioned above, both passages are arranged to extend in at least the longitudinal direction X. That is, the at least one passage of the intermediate spacer member extending in at least the longitudinal direction X is a first passage, wherein the intermediate spacer member further includes a second passage being spaced apart from the first passage and extending in at least the longitudinal direction X.

According to one embodiment when the intermediate spacer member comprises a first passage and a second passage, as mentioned above, the first passage is arranged to extend in the longitudinal direction X, while the second passage is arranged to extend in both the longitudinal direction and the transverse direction Y. That is, the at least one passage of the intermediate spacer member extending in at least the longitudinal direction X is a first passage, wherein the intermediate spacer member further includes a second passage being spaced apart from the first passage, while a part of the second passage is inclined in relation to the longitudinal direction X. To this end, the first passage and the second passage are disposed so as to be relatively near each other at the first end and divergingly angled so as to be spaced further apart at the second end of the intermediate spacer member.

According to one embodiment, the intermediate spacer member further includes a third passage spaced apart from the first passage and the second passage, allowing each opening of each passage at the second end to be displaced from each other. There are several different possibilities to arrange the passages in the spacer member in order to position and secure the bundles at various distances from each other and in different directions. As an example, the first passage, arranged in-between the second passage and, the third passage as seen in a transverse direction Y, may only extend in the longitudinal direction x, while the second passage and the third passage are angled in opposite direction to each other and directed away from the first passage.

According to a second aspect of the present invention, there is provided a vehicle frame for a vehicle having an outer frame surface and, an inner frame surface. Typically, the outer frame surface is represented by the second side of the structural member and the inner frame surface is represented by the first side of the structural member, as mentioned above. In addition, a region of the frame is provided with an aperture configuration extending between the outer frame surface and the inner frame surface for receiving the elongated strap members which are associated to a single head member. The fastening device may be provided according to the first aspects and/or the example embodiments as mentioned above.

Hereby, it becomes possible to secure at least two bundles of elongated vehicle components to one single fastening device. Further effects of this second aspect of the present invention are largely analogous to those described above in relation to the first aspect of the present invention.

Typically, the aperture configuration comprises a plurality of adjacent apertures. As an example, the apertures are positioned vertically on top of each other Typically, the aperture configuration is configured for allowing tying a first and second bundle of elongated vehicle components via a fastening device according to the first aspect and/or any one of the example embodiments as mentioned above.

According to one embodiment, the distance between a first aperture and a second aperture of the adjacent apertures is between 30-40 mm. In this example embodiment, the distance refers to a distance between the centres of the bundles. One advantage with this distance range is that the assembly of the elongated strap members to the fastening device is facilitated. However, it should also be appreciated that the distance may in some cases be between 30-80 mm. According to one embodiment, a distance between a first aperture and a second aperture of the adjacent apertures should be selected so that a gap as defined between the first bundle and the second bundle is about between 0-40 mm, preferably about between 10-30.

The invention also relates to a vehicle frame assembly, which comprises a fastening device according to the first aspect and/or example embodiments as mentioned above with respect to the first aspect of the invention, i.e. the features and effects relating to the fastening device, and further comprises a vehicle frame according to the second aspect and/or example embodiments as mentioned above with respect to the second aspect of the invention. As an example, the vehicle frame has an outer frame surface and an inner frame surface, wherein a region of the frame is provided with an aperture configuration extending between the outer frame surface and the inner frame surface for receiving the elongated strap members. The elongated strap members are associated to the head member of the fastening device.

In this type of vehicle frame assembly, the first elongated strap member and the second elongated strap member are passed through the head member of the fastening device and the vehicle frame to encircle a first bundle of vehicle components and a second bundle of vehicle components, respectively, and further passed back through the vehicle frame and the head member, wherein the first elongated strap member and the second elongated strap member are tied from the top side of the head member so that an abutment surface of the head member abuts the outside surface of the vehicle frame to secure the plurality of elongated vehicle components to the inner side of the vehicle frame. As such, it becomes possible to secure the plurality of elongated vehicle components to the inner surface of vehicle frame, typically corresponding to the first side of the structural member mentioned herein.

The invention also relates to a vehicle comprising a vehicle frame assembly according to any one of the aspects and/or example embodiments as mentioned above with respect to the first aspect and/or the second aspect of the present invention, i.e. the aspects relating to the vehicle frame assembly, the vehicle frame and/or the fastening device.

Although the invention will be described in relation to a truck, the invention is not restricted to this particular vehicle, but may also be used in other type of vehicles such as buses, construction equipment, cars, industrial construction machines, wheel loaders, etc.

According to a third aspect of the invention, a method is provided. According to the third aspect of the present invention, there is provided a method of securing a plurality of elongated vehicle components to a first side of a vehicle structural member with a fastening device comprising a first elongated strap member configured to form a loop around a first bundle of the elongated vehicle components, a second elongated strap member configured to form a loop around a second bundle of the elongated vehicle components, and a head member configured to be positioned on a second side of the vehicle structural member opposite the first side. The head member is provided with a through hole configuration for receipt of two portions of the first elongated strap member forming the loop and two portions of the second elongated strap member forming the loop. The method comprises the steps of:

inserting a leading free end of the first elongated strap member into the through hole configuration of the head member and further into an aperture configuration of the structural frame;

encircling the first elongated strap member about the first bundle of elongated vehicle components and further inserting the leading free end of the first elongated strap member back through the aperture configuration of the structural frame and the through hole configuration of the head member until at least a part of the leading free end of the first elongated strap member is located outside the second side of the vehicle structural member;

inserting a leading free end of the second elongated snap member into the through hole configuration of the head member and further into the aperture configuration of the structural frame;

encircling the second elongated strap member about the second bundle of elongated vehicle components and further inserting the leading, free end of the second elongated strap member back through the aperture configuration of the structural frame and the through hole configuration of the head member until at least a part of the leading free end of the second elongated strap member is located outside the second side of the vehicle structural member;

securing the fastening device to the vehicle structural member by tying first elongated strap member and/or the second elongated strap member from an opposite side of the head member relative to the vehicle structural member until the head member abuts the second side of the vehicle structural member.

Effects and features of this third aspect of the present invention are largely analogous to those described above in relation to the other aspects of the present invention.

According to one example embodiment, the leading free end of the first elongated strap member and the leading free end of the second elongated strap member are inserted simultaneously into the through hole configuration.

The invention also relates to an intermediate spacer member for fastening a plurality of elongated vehicle components to a first side of a vehicle structural member, wherein the intermediate spacer member is configured to be positioned on the first side of the vehicle structural member for holding the plurality of elongated vehicle components at a distance from the first side of the vehicle structural member. The intermediate spacer ember has opposite first end and second end and a passage configuration extending therebetween for receiving a first and a second elongated strap member, which are each configured to form a loop around a first and second bundle, respectively, of the elongated vehicle components.

Preferably, the intermediate spacer member has an elongated configuration, wherein a main extension direction of the intermediate spacer member is in parallel with the longitudinal direction X of the passage configuration.

Further preferably, the intermediate spacer member is configured to be arranged in such a way in relation to the vehicle structural member that a main extension direction of the intermediate spacer member is perpendicular to an extension direction of the first side of the structural member. Further preferably, in the case of the structural member forming a vehicle frame, the intermediate spacer member is configured to be arranged in such a way in relation to the vehicle frame that the main extension direction of the intermediate spacer member is perpendicular to the main extension direction of the vehicle frame, which is in a longitudinal direction of the vehicle.

Further optimal features and further effects of the intermediate spacer member are mentioned above.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings:

FIG. 7a schematically illustrates an assembly sequence of an assembler, in which the assembler is mounting the fastening device and a set of elongated vehicle components to a vehicle frame according to a prior art solution;

FIG. 7b schematically illustrates an assembly sequence of an assembler, in which the assembler is mounting the fastening device and a set of elongated vehicle components to a vehicle frame according to an example embodiment of the present invention;

DETAILED DESCRIPTION

Figure 1:
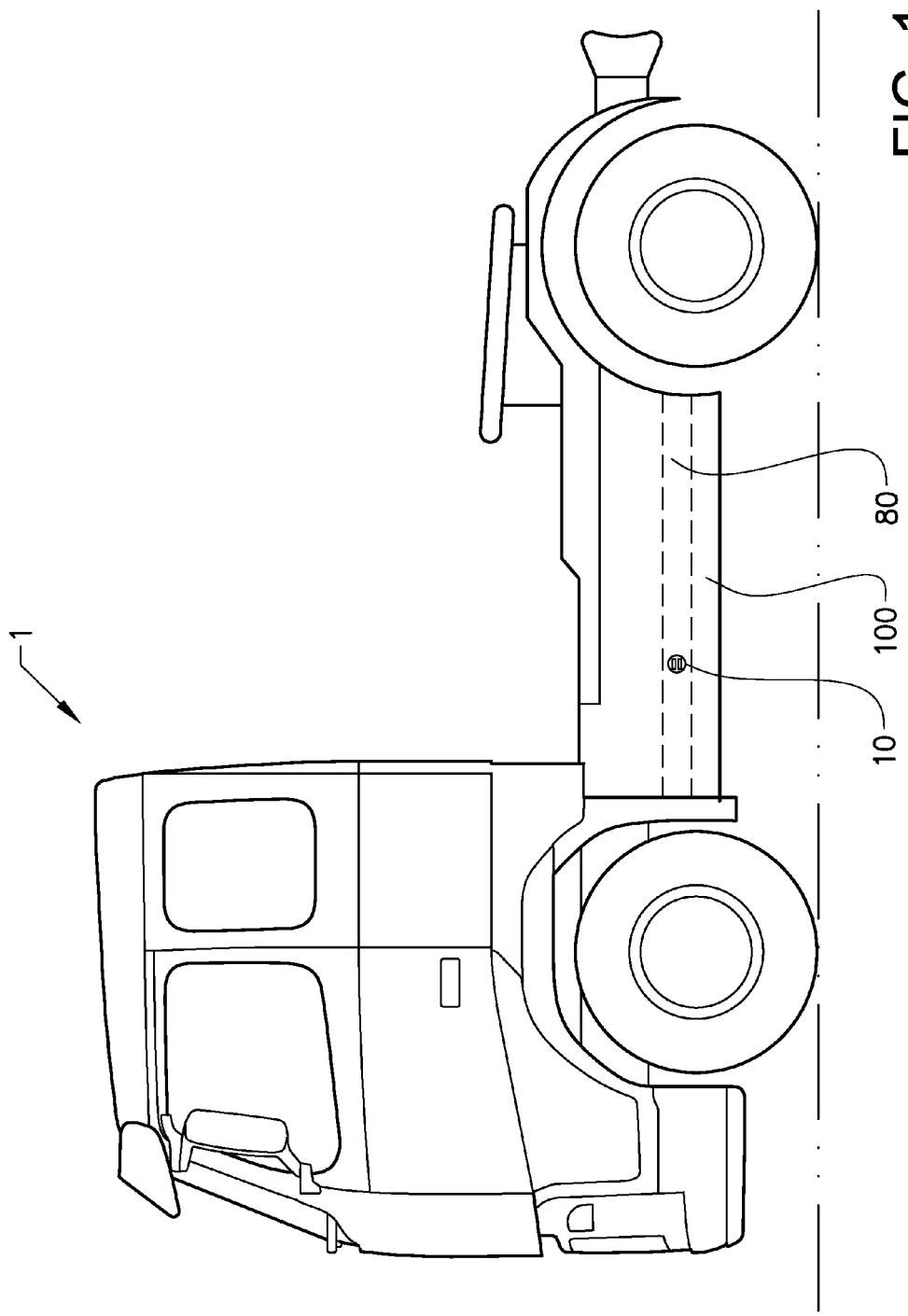
FIG. 1 is a perspective view of a vehicle in the form of a truck, which is provided with a vehicle frame assembly including a vehicle frame and a fastening device according to an example embodiment of the present invention.

The present invention will now be described more fully hereinafter with reference to the accompanying drawings, in which exemplary embodiments of the invention are shown. The invention may, however, be embodied in many different forms and should not be construed as limited to the embodiment set forth herein; rather, these embodiments are provided for thoroughness and completeness. Like reference characters refer to like elements throughout the description.

FIG. 1 is a perspective view of a vehicle 1, which is provided with a vehicle frame assembly 100 including a vehicle frame and a fastening device according to an example embodiment of the present invention. The vehicle frame assembly 100, the vehicle frame 80 (representing the vehicle structural member) and the fastening device 10 are described in further detail with reference to FIGS. 1, 2, 3a-3c, 4a -4b, 5 and 6. The vehicle 1 in FIG. 1 is provided in the form of a truck, and the following example embodiments of the invention are described based on an exemplary truck to illustrate the configuration of the vehicle frame assembly and the fastening device of the invention. However, such does not mean that the invention will be limited to an installation of the vehicle frame assembly and/or the fastening device in a truck. In contrary, the vehicle may be a car, industrial construction machine, wheel loader and the like.

As will be readily understood from the description and with particular reference to FIGS. 7a and 7b, one example advantage of the example embodiments of the present invention is to improve the ergonomics for the assembly workers in production and assembly of vehicles.

Figure 2:
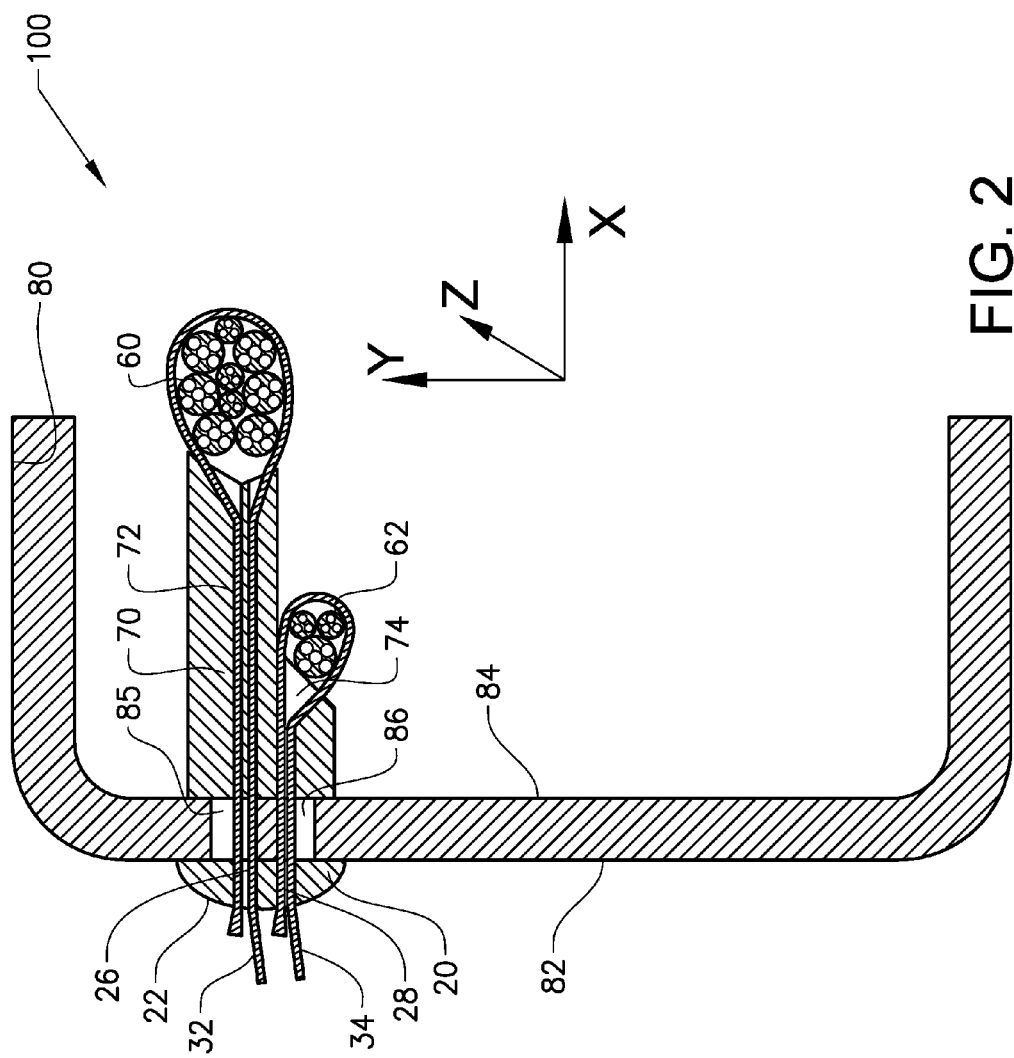
FIG. 2 schematically illustrates a first example embodiment of a part of a structural member in the form of a vehicle frame, in which a plurality of elongated vehicle components are secured to the structural member by means of a fastening device according to the present invention, wherein the vehicle frame assembly is in an assembled configuration.

FIG. 2 schematically illustrates a cross-sectional view of a vehicle frame assembly comprising a fastening device according to the first example embodiment of the invention. Thus, in this example embodiment, the vehicle structural member is sometimes referred to as the vehicle frame. As shown in the figure, the vehicle frame assembly is in an assembled configuration. The vehicle frame assembly 100 here comprises a fastening device 10 and a vehicle frame 80. The features of the fastening device will be described in more detail with references to FIGS. 2, 3a-3c, 4a-4b, 5a-5b and 6. Thus, even though the fastening device 10 as shown in FIG. 2 is one detailed example of an example embodiment of the invention that can be used to secure the plurality of elongated vehicle components to the vehicle frame, it should be readily appreciated that any one of the example embodiments as described with references to FIGS. 3a-3c, 4a-4b, 5a-5b and 6 can be used to secure the plurality of elongated vehicle components to the vehicle frame a shown in FIG. 2. The vehicle frame in FIG. 2 is suitable for being installed in the vehicle in FIG. 1. Likewise, the vehicle frame assembly in FIG. 2 is suitable for being installed in the vehicle in FIG. 1.

As illustrated in FIG. 2, the vehicle frame 80 has an outer frame surface 82 and an inner frame surface 84. In other words, the outer frame surface is facing the exterior of the vehicle. Thus, the inner frame surface is facing the interior of the vehicle. In a region of the frame shown in FIG. 2, the vehicle frame 80 is provided with an aperture configuration 85, 86 extending between the outer frame surface 82 and the inner frame surface 84 for receiving two or more elongated strap members 32, 34, which are associated to a single head member 20. In this example embodiment, the aperture configuration comprises a plurality of adjacent apertures 85, 86. The apertures are positioned vertically on top of each other. The aperture configuration 85, 86 is configured for allowing tying of a first and a second bundle of elongated vehicle components 60, 62 via the fastening device 10. The cross-sectional dimension of an aperture, as seen in the transverse direction Y, is typically slightly bigger than the cross-sectional dimension of the elongated strap member, as seen in the transverse direction y, to be inserted into the aperture. In addition, the shape of the aperture is typically circular, as seen in the transverse direction Y. However, also other shapes are conceivable such as a rectangular or triangular cross-sectional shape. As an example, the cross-sectional dimension of the aperture may be about 3-8 mm. The distance between the adjacent apertures, as seen in the transverse direction Y, may vary according to the, size of the head member and the size of the elongated strap members. As an example, the distance between a first aperture 85 and a second aperture 86 of the adjacent apertures can be between 30-40 mm. In this example embodiment, the distance refers to a distance between the centres of the bundles, as seen in the transverse direction Y. One advantage with this distance range is that the assembly of the elongated strap members to the fastening device is facilitated. However, it should also be appreciated that the distance may in sonic cases be between 30-80 mm. It is also to be noted that there is typically a gap between the first bundle and the second bundle, as seen in the transverse direction Y, when the vehicle frame assembly is in an assembled configuration. Thus, the distance between a first aperture and a second aperture of the adjacent apertures should be selected so that a gap as defined between the first bundle and the second bundle is about between 0-40 mm, as seen in the transverse direction.

Figure 4A:
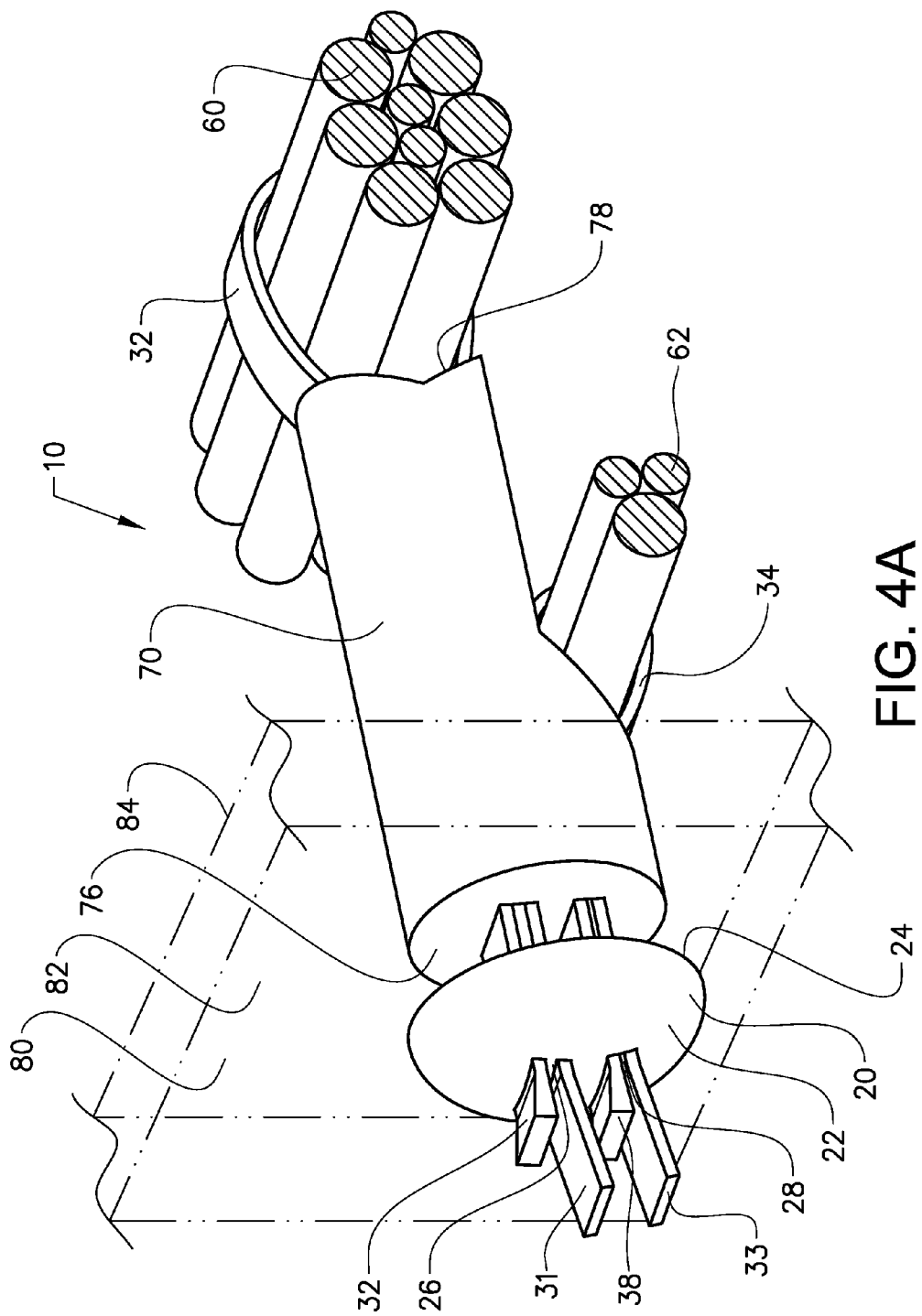
FIG. 4a is a perspective view of a second example embodiment of the fastening device according to the present invention, in which the fastening device is fastened to a vehicle frame.
Figure 4B:
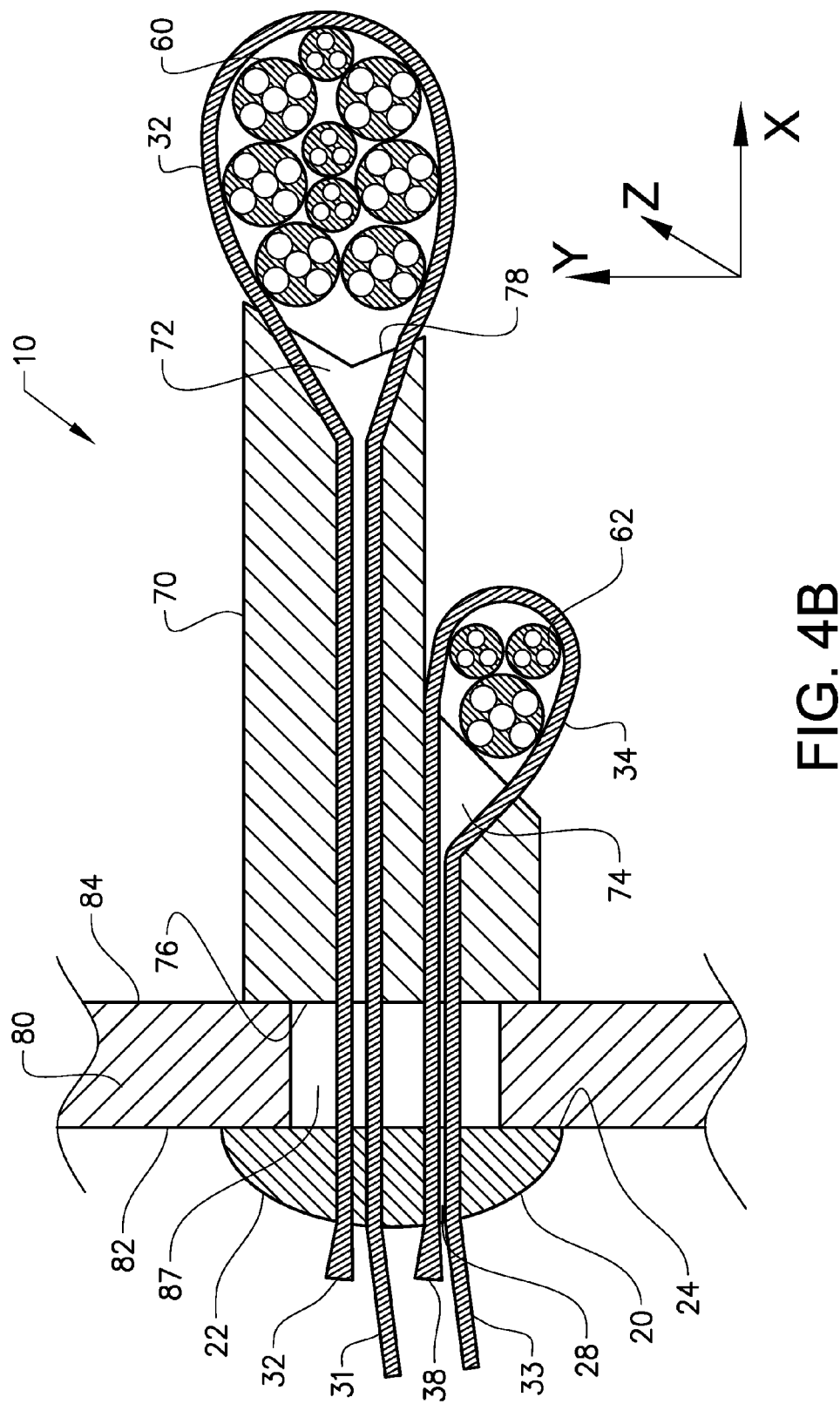
FIG. 4b schematically illustrates a cross sectional view of the second example embodiment of the fastening device in FIG. 4a according to the present invention.

In another example embodiment, although not, shown in the FIG. 2, but in FIG. 4b, it would also be possible to a provide vehicle frame having an aperture configuration 87 in the form of a single aperture extending between the outer frame surface and the inner frame surface for receiving two or more elongated strap members which are associated to a single head member. In this type of embodiment, the single aperture is dimensioned to receive both elongated strap members.

As illustrated in FIG. 2, the fastening device comprises the first elongated strap member 32 and the second elongated snap member 34. The first elongated strap member is configured to form a loop around a first bundle of the elongated vehicle components 60. The second elongated strap member 34 is configured to form a loop around a second bundle of the elongated vehicle components 62. Furthermore, the head member 20 of the fastening device is configured to be positioned on, a second side 82 (outer frame surface) of the vehicle frame 80 opposite the first side 84 (inner frame surface), In addition, the head member 20 is provided with a through hole configuration 26, 28 for receipt of two portions of the first elongated strap member 32 forming the loop and two portions of the second elongated strap member 34 forming the loop. Thus, the bead member is configured to allow tying of the first elongated strap member 32 from the second side 82 of the vehicle structural member 80 and configured to allow tying of the second elongated strap member 34 from the second side 82 of the vehicle structural member 80.

Thus, the head member is configured to allow tying of the first elongated strap member 32 from a top side of the head member 22 and configured to allow tying of the second elongated strap member 34 from the top side of the head member 22.

In this example embodiment, the through hole configuration is defined by a first through hole 26 and a second through hole 28. One example advantage with this configuration is that the engagement of each elongated strap member to the head member becomes more reliable since each elongated strap member is encircled by the through hole inner surface, only, as seen in a radial cross-sectional view of the head member, i.e. the transverse direction Y. In other words, any contact between the strap members can be avoided.

Figure 3A:
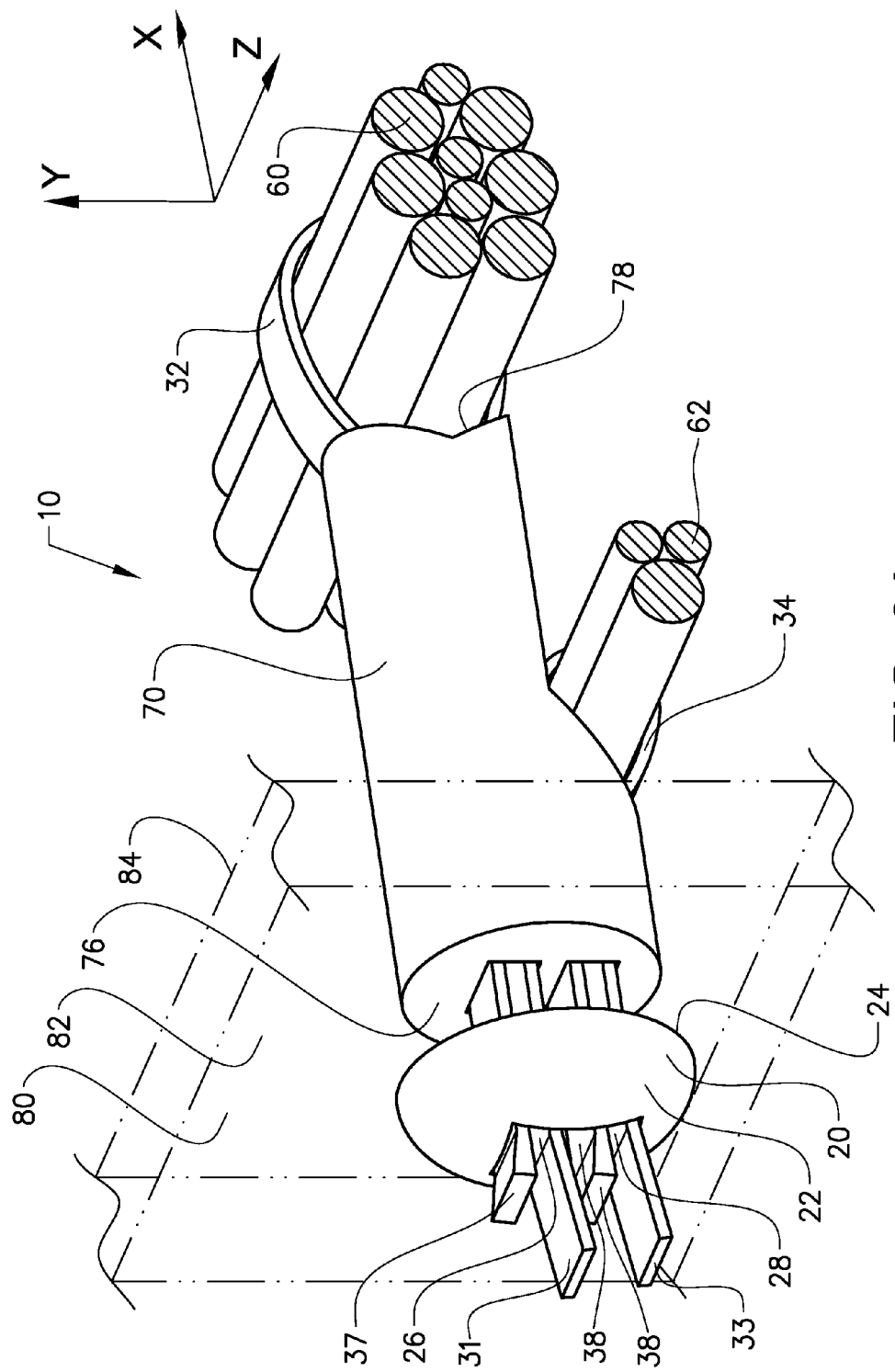
FIG. 3a is a perspective view of the first example embodiment of the fastening device according to the present invention, in which the fastening device is fastened to a vehicle frame.
Figure 3B:
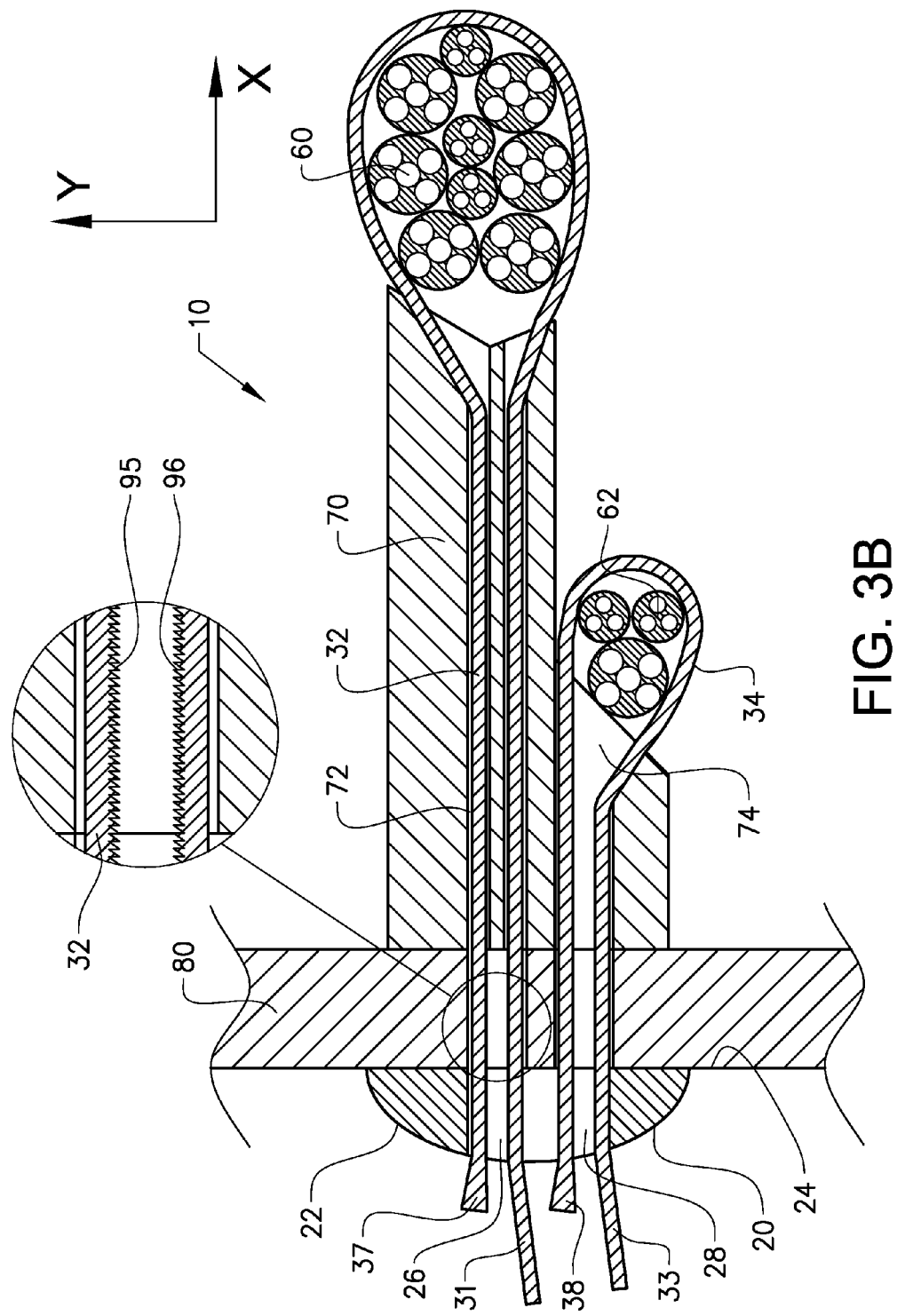
FIG. 3b schematically illustrates a cross sectional view of the first example embodiment of the fastening device in FIG. 3a according to the present invention.
Figure 3C:
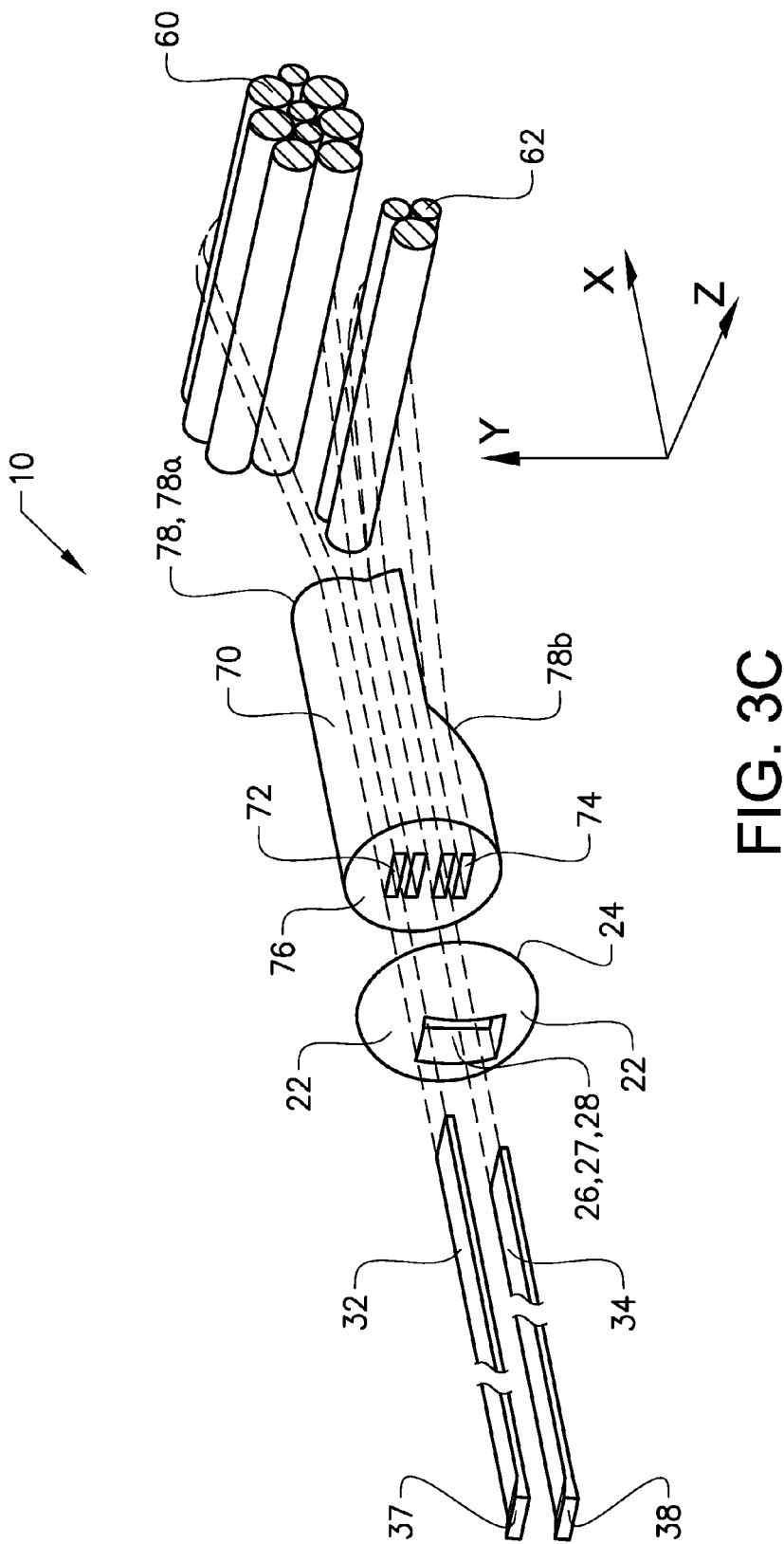
FIG. 3c is an exploded view of the first example embodiment in FIG. 3a and FIG. 3b according to the present invention.

However, as will be evident from FIGS. 3a-3c, the through hole configuration may also be defined by one single through hole 27.

By this configuration, the vehicle frame assembly enables that the fastening of the elongated vehicle components 60, 62 and the assembly of the fastening device to the vehicle frame can be operated and controlled by the users from the outside of the frame. Thus, the vehicle frame assembly including the fastening device overcomes the problem of internal tightening of bundles or tightening the bundles before assembling the complete vehicle frame.

To this end, the at least first elongated strap member 32 and the second elongated strap member 34 are passed through the head member 20 of the fastening device and the vehicle frame to encircle the first bundle of vehicle components 60 and the second bundle of vehicle components 62, respectively, and further passed back through the vehicle frame and the head member. Subsequently, the first elongated strap member 32 and the second elongated strap member 34 are tied from the top side 22 of the head member so that an abutment surface of the head member abuts the outside surface of the frame 82 to secure the plurality of elongated vehicle components to the frame 80. The tying configuration and the sequences will be further described in relation to the Figures hereinafter.

Typically, although not strictly required, the fastening device 10 here comprises an intermediate spacer member 70 for fastening the plurality of elongated vehicle components 60, 62 to the first side of the vehicle structural member 80. As shown in FIG. 2, the intermediate spacer member 70 is configured to be positioned on the first side 84 of the vehicle structural member, here represented by the inner surface of the frame, for holding the plurality of elongated vehicle components 60, 62 at a distance from the first side of the vehicle structural member 80. In addition, as is clearly shown in FIG. 3c, the intermediate spacer member 70 has opposite first end 76 and second end 78 and a passage configuration 72, 74 extending therebetween for receiving the first elongated strap member 32 and the second elongated strap member 34. As shown in the Figures, the passage configuration extends in at least the longitudinal direction of the intermediate spacer member 70. The first elongated strap member 32 and the second elongated strap member 34 are configured to form a loop around a first and a second bundle, respectively, of the elongated components 60, 62. Hereby, which also can be realised from the example embodiment in FIG. 2, the intermediate spacer member 70 enables that the first elongated trap member 32 and the second elongated strap member 34 can be secured at a distance from the structural member 80.

In this example embodiment, the intermediate spacer member has an elongated configuration, wherein a main extension direction of the intermediate spacer member 70 is in parallel with the longitudinal direction X of the passage configuration 72, 74. The intermediate spacer member is configured to be arranged in such a way in relation to the vehicle structural member 80 that a main extension direction of the intermediate spacer member is perpendicular to an extension direction of the first side 84 of the structural member. In the case of the structural member forming a vehicle frame, the intermediate spacer member can be configured to be arranged in such a way in relation to the vehicle frame that the main extension direction of the intermediate spacer member is perpendicular to the main extension direction of the vehicle frame, which is in a longitudinal direction of the vehicle.

Figure 5A:
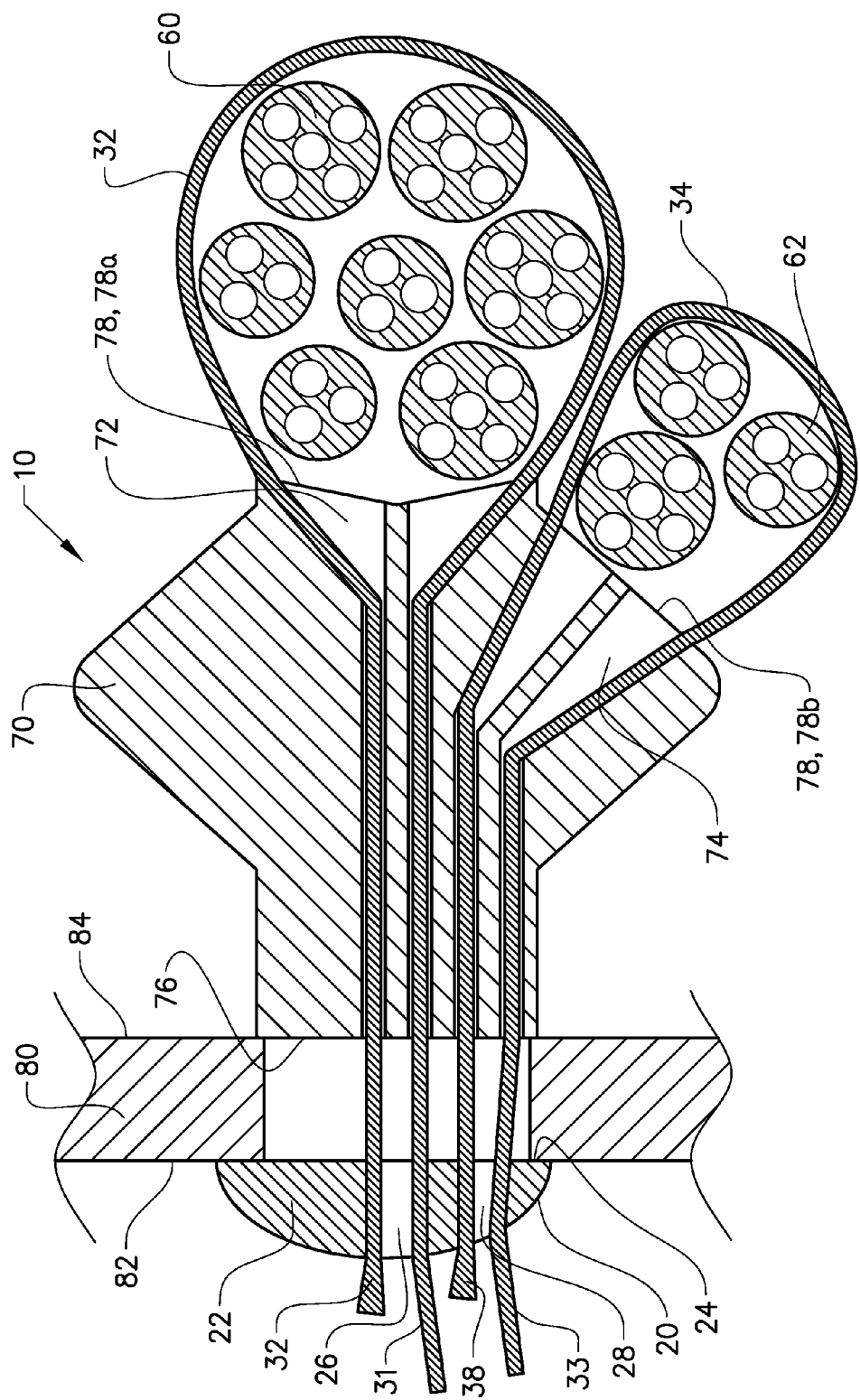
FIG. 5a schematically illustrates a third example embodiment of the fastening device according to the present invention, in which the fastening device is fastened to a vehicle frame.
Figure 5B:
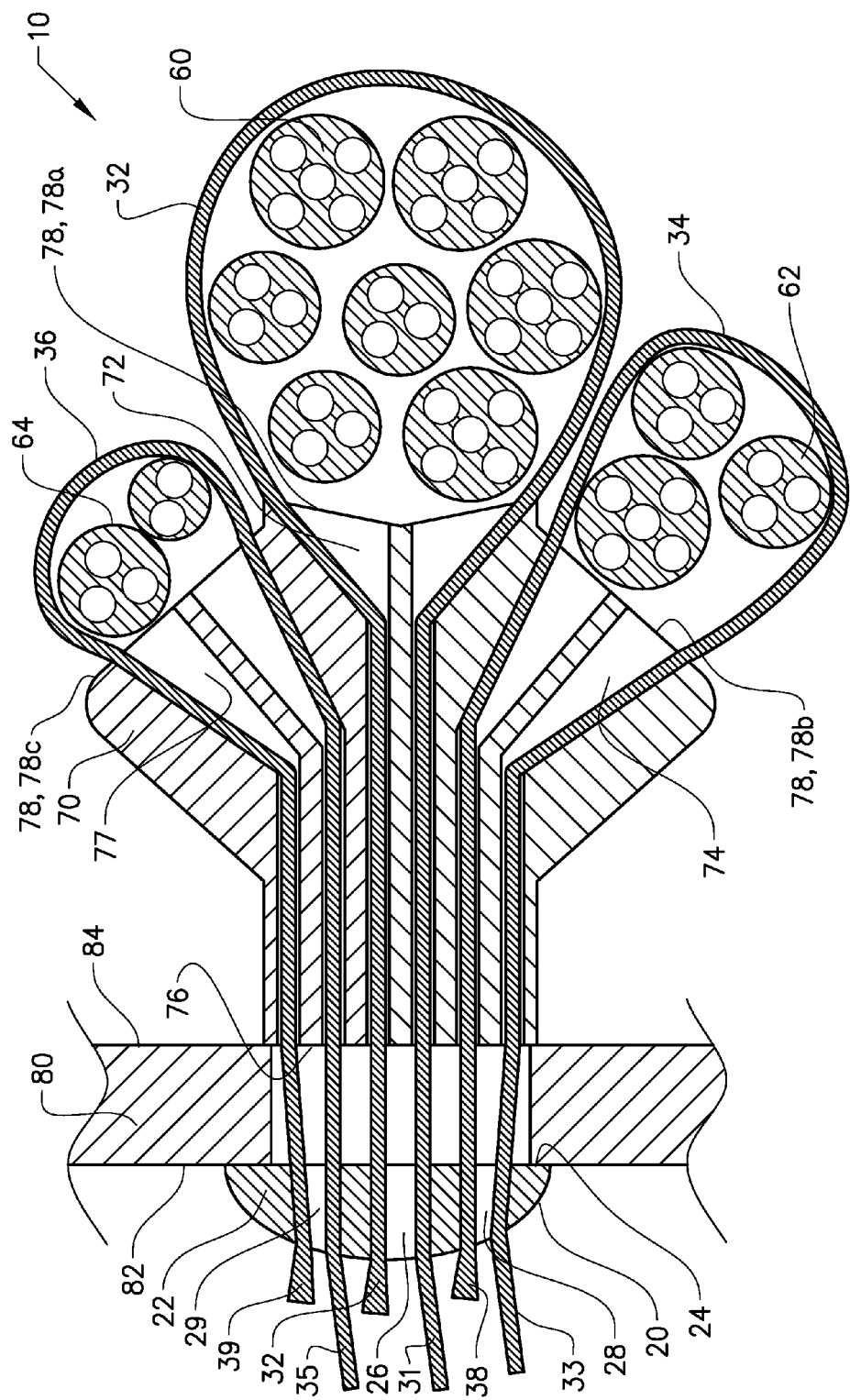
FIG. 5b schematically illustrates a fourth example embodiment of the fastening device according to the present invention, in which the fastening device is fastened to a vehicle frame.

Various example embodiments of the intermediate spacer member are described in relation to FIGS. 3b, 5a and 5b. It should readily be appreciated that any one of the example embodiments described herein can be used in the vehicle frame assembly as described in relation to FIG. 2 above.

In addition, as may be gleaned from FIG. 2, the first passage 72 here is provided with a small longitudinal extending tooth within the first passage to further divide the passage into a first slot and a second slot for a first part of the strap member and a second part of the strap member, respectively. One reason for this design of the passage is that the longitudinal extending tooth can be configured to project from the first end 76 into the aperture of the vehicle frame so that the spacer member is not slipping off the vehicle frame, in a pre-assembly purpose, prior to wrapping the bundles to the spacer. This is, however, known in the art and is therefore not further described herein. Accordingly, it should be noted that although some example embodiments are provided with this longitudinal extending tooth, the component is considered optional, and not strictly required for the design of the spacer member. In other words, the first passage and/or the second passage can be provided with or without this feature.

When the fastening device is fastened to the vehicle frame so that the plurality of the elongated vehicle components are secured to the structural member (vehicle frame), by means of the fastening device, the vehicle frame assembly is considered to be in an assembled configuration, which is illustrated in FIG. 2.

Before turning to the detailed example embodiments of the fastening device, it is to be noted that the fastening device and the intermediate spacer member according to any one the example embodiments as described with references to FIGS. 3a-3c, 4a-4b, 5a-5b and 6 can be installed and used to secure elongated vehicle components to a structural member of a vehicle, as exemplified by the description in relation to FIGS. 1 and 2 above.

FIG. 3a through 3c illustrate the first example embodiment according to the present invention in more detail. FIG. 3a is a perspective view of the first example embodiment of the fastening device according to the present invention, in which the fastening device is fastened to a vehicle frame, FIG. 3b schematically illustrates a cross sectional view of the first example embodiment of the fastening device in FIG. 3a according to the present invention, while FIG. 3c is an exploded view of the first example embodiment in FIG. 3a according to the present invention.

As shown in FIG. 3a, the fastening device 10 is depicted in its assembled configuration to the structural member 80. The fastening device in FIGS. 3a-3c may include all functions and features as described in relation to FIG. 2. The fastening device 10 here is configured for securing the elongated vehicle components 60, 62 to the first side of the vehicle structural member 80, i.e., the inner surface 84 of the vehicle frame. In this example, the elongated vehicle components are illustrated as cables. However, the elongated vehicle components may likewise be electric cables, hoses, wires or the like.

The fastening device 10 comprises the first elongated strap member 32 configured to form a loop around the first bundle of the elongated vehicle components 60. The head member 20 is configured to be positioned on the second side 82 of the vehicle structural member 80, i.e. the outer surface of the vehicle frame, which is opposite the first side. In addition, the bead member 20 here is provided with a through hole configuration 27 in the form of a single through hole for receipt of two portions of the first elongated strap member 32 forming the loop.

A loop around the first bundle of the elongated vehicle components is obtained by inserting the first elongated member into the through hole configuration of the head member and further into an aperture configuration of the structural member, encircling the first elongated strap member about the first bundle of elongated vehicle components and further inserting the first elongated strap member back through the aperture configuration of the structural member and the through hole configuration of the head member until at least a part of the first elongated strap member is located outside the top side of the head member. Thus, the first elongated strap member is inserted back through the aperture configuration of the structural member and the through hole configuration of the head member until at least a part, of the first elongated strap member is located outside the second side of the structural member.

The head member is further configured to allow tying of the first elongated strap member 32 from the top side of the head member 22. Thus, the bead member is configured to allow tying of the first elongated strap member 32 from the second side 82 of the structural member. That is, the first elongated strap member is capable of being tensioned from the top side of the head member by having a head member through hole configuration (for receipt of two portions of the strap member) extending from the abutment surface 24 to the top side 22 so that the abutment surface of the head member abuts the outside surface of the frame 82 when the first elongated strap member is tied from the top side 22 in order to secure the elongated vehicle components 60 to the inner frame surface 84 (or indirectly to the inner frame surface via the intermediate spacer member 70).

Furthermore, the fastening device 10 comprises the second elongated strap member 34 being configured to form a loop around the second bundle of the elongated vehicle components 62. Thus, the head member through hole configuration 26, 27, 28 is also configured for receipt of two portions of the second elongated strap member forming the loop.

A loop around the second bundle of the elongated vehicle components is obtained by inserting the second elongated member into the through hole configuration of the head member and further into an aperture configuration of the structural member, encircling the second elongated strap member about the second bundle of elongated vehicle components and further inserting the second elongated strap member back through the aperture configuration of the structural member and the through hole configuration of the head member until at least a part of the second elongated strap member is located outside a top side of the head member. Thus, the second elongated strap member is inserted back through the aperture configuration of the structural member and the through hole configuration of the head member until at least a part of the second elongated strap member is located outside the second side of the structural member.

Moreover, the head member 20 is configured to allow tying of the second elongated strap member 34 from the top side of the head member 22. Thus, the head member is configured to allow tying of the second elongated strap member 34 from the second side 82 of the structural member. That is, the second elongated strap member is capable of being tensioned from the top side of the head member by having a head member through hole configuration (for receipt of two portions of the strap member) extending from the abutment surface 24 to the top side so that the abutment surface of the head member abuts the outside surface of the frame 82 when the second elongated strap member is tied from the top side 22 in order to secure the elongated vehicle components 62 to the inner frame surface 84 (or indirectly to the inner frame surface via the intermediate spacer member 70).

As illustrated in for example FIG. 3b, the head member 20 is thus configured to be forced against the second side 82 of the vehicle structural member 80 when the first elongated strap member and/or the second elongated strap member 34 is tied from the top side of the head member 22. It should be readily appreciated that although the head member as shown in FIGS. 3a-3c is forced against the second side by tying both the first elongated strap member 32 and the second elongated strap member 34, the head member can likewise be forced against the second side by tying only the first elongated strap member 32 or only the second elongated strap member 34.

By a configuration according to the example embodiment as shown in FIGS. 3a-3c, the head member 20 is adapted to abut the outside surface 82 of the structural member when the first elongated strap member 32 and the second elongated strap member 34 are tied from the top side of the head member 22 after being inserted from the top side into the through hole configuration 26, 27, 28, and subsequently being inserted back through the through hole configuration 26, 27, 28.

Thus, besides that the head member 20 has the top side 22, the head member here is defined by an abutment surface 24 for abutting the second side of the vehicle structural member 80. The abutment surface 24 is on an opposite side of the head member 20 in relation to the top side 22.

Moreover, the through hole configuration 26, 27, 28 here extends from the top side 22 to the abutment surface 24. In this way, the configuration allows for tying of the first elongated strap member 32 and the second elongated strap member 34 from the top side 22 of the head member 20.

Each elongated strap member is typically a longitudinally-extending member. As shown in FIGS. 3a through 3c, the length of each elongated strap member is dimensioned so that elongated strap member can pass through the head member, the vehicle structural member, the intermediate spacer member and about the elongated vehicle components, and then back through the intermediate member, the vehicle structural member and the head member in order to be tied from the top side of the head member. The cross-sectional shape of the strap member is typically rectangular. However, the cross-sectional shape may alternatively be circular, triangular or the like. It should thus be readily appreciated that the dimensions and the shape of each elongated strap member may vary depending on the configuration and dimensions of the components involved in the final design of the vehicle frame assembly. One example of a material suitable for the elongated strap members is nylon or PA66. Generally, the elongated strap member can be formed from a suitable thermoplastic material. However, other material suitable for the purpose may likewise be conceivable.

Optionally, although not strictly required, each elongated strap member may include engagement means in order to provide a locking configuration between the elongated strap member and the head member were being tied from the top side of the head member. Thus, as shown in the example embodiment in FIGS. 3a-3c, and in other example embodiments of the invention, each elongated strap member is provided with a first free leading end and a second end having engagement means for engaging with the head member 20. Accordingly, the first elongated strap member 32 has a first free leading end 31 and a second end engagement means 37. Analogously, the second elongated strap member 34 has a first free leading end 33 and a second end engagement means 38.

Typically, the engagement means at the second end may be provided in the form of a locking head. The locking head is generally wedge-shaped so as to be engageable with the through hole configuration. Typically, the size and the shape of the wedge is large enough to prevent its being pulled fully through the through hole configuration. Accordingly, each elongated strap member here includes a wedge and an elongate portion. The wedge here is configured as triangle-shaped pawl having a front surface, a back surface and opposing side walls. The elongate portion, on the other hand, may include a plurality of serrations (or teeth) formed along at least one longitudinally-extending planar surface 95 of the elongate portion a the elongated strap member, which is for instance shown in FIG. 3b. However, in some example embodiments, as shown in FIG. 3b, opposite planar surfaces 95, 96 of the elongate portion of the elongated strap member may include a plurality of serrations. The serrations of the elongated strap members are configured to engage with the engagement means of the second end engagement means in order to further improve the engagement of the elongate portion to the wedge portion, i.e. the second end engagement means. It is to be noted that the serrations and/or the wedge is only optional, and that there are several different possibilities available in order to provide a locking configuration of the elongated strap member when being tied from the top side of the head member. Accordingly, it is considered known in the art that an elongated strap member may include a section with serrations, or teeth, that engage with a pawl in the head of the elongated strap member to form a ratchet so that as the free leading end of the elongated strap member is pulled, the tie-wrap tightens and does not come undone.

In a locking configuration, the elongated strap members 32, 34 and the head member 20 are engaged, typically with the engagement means 37, 36 seated in the through hole configuration 26, 27, 28 of the head member and the elongated strap member 32, 34 extending out from the top side of 22 the head member.

In addition, a tensioning device or tool may be used to apply a cable tie with a specific degree of tension. The tool may cut off the extra tail flush with the head in order to avoid a sharp edge which might otherwise cause injury.

In the example embodiment in FIGS. 3a-3c, and in all other example embodiments of the invention, the head member is, generally a so-called button-head member. The button-head member has a top side 22, and typically an abutment surface 24. As is illustrated in the Figures, the button-head member is generally dome-shaped. As an example, the material of the button-head member is a thermoplastic material such as nylon or PA66 in different formulas. However, also some metals, such as stainless steel, may be conceivable as a suitable material.

In addition, as shown in the Figures, the head member 20 is formed separately and independently from the elongated strap members. It should, however, be readily appreciated that the head member and the elongated strap members may be integrated in one single integral unit.

In the example embodiment described in relation to FIGS. 3a-3c, the fastening device here includes the intermediate spacer member 70. The intermediate spacer member 70 defines a spaced relation between the head member 20 and the vehicle components 60, 62 to be secured to the intermediate spacer member. In other words, the intermediate spacer member 70 defines a spaced relation between the vehicle structural member 80 and the vehicle components 60, 62 to be secured to the vehicle structural member.

The shape of the intermediate spacer member in this example embodiment resembles a cylinder. However, other shapes may be conceivable such as a cube, cuboid or the like.

As mentioned above, the intermediate spacer member has opposite first end 76 and second end 78 and a passage configuration 72, 74 extending therebetween for receiving at least one of the first and second elongated strap members. In this example embodiment, the passage configuration here comprises a first passage 72 adapted to receive the first elongated strap member 32 and a second passage 74 adapted to receive the second elongated strap member 34. Although it should be readily appreciated that in some example embodiments (not shown), the passage configuration may only be a single passage adapted, to receive both last and second elongated strap members. As shown in the Figures, the intermediate spacer member 70 is disposed in-between the vehicle structural member 80 and the plurality of bundles of vehicle components 60, 62.

As mentioned above, the intermediate spacer member 70 is configured to be positioned on the first side of the vehicle structural member for holding the plurality of elongated vehicle components 60, 62 at a distance from the first side of the vehicle structural member.

In the example embodiment in FIGS. 3a-3c, the passages are straight passages essentially extending in the longitudinal direction X of the spacer member.

In other words, the first passage 72 and the second passage 74 extend in parallel with each other along a substantial part of the extension of the intermediate spacer member 70 in the longitudinal direction X.

The cross-section of the passage is typically circular. However, rectangular-shaped cross-sections or the like may be conceivable as well. Therefore, it should be appreciated that although a passage inevitably has an extension in the transverse direction (i.e. in a direction perpendicular to the longitudinal direction), the essential extension of the passage is along the longitudinal direction X. In other words, as shown in FIGS. 3a-3c, the first passage 72 of the intermediate spacer member extends in at least the longitudinal direction X. Analogously, the second passage 74 of the intermediate spacer member extends in at least the longitudinal direction X. The second passage is spaced apart from the first passage. In other words, the first bundle of the elongated vehicle components is distanced from the second bundle of the elongated vehicle components in transverse direction of the intermediate spacer member. In an assembled configuration of the fastening device, the elongated strap members are located within the first and second passages, respectively. In addition, as shown in the Figures, the length of the first passage in the longitudinal direction X is longer than the length of the second passage in the longitudinal direction X. In this manner, it becomes possible to locate the first bundle of the vehicle components 60 at a first distance, and the second bundle of the vehicle components 62 at second distance. In addition, the first distance is longer than the second distance as seen in the longitudinal direction X.

Thus, in some example embodiments of the invention, the second end 78 may be defined by a second sub-end 78a and a second sub-end 78b. In other words, the first passage extends between the first end and the second sub-end 78a, while the second passage extends between the first end and the second sub-end 78b, as shown in FIG. 3c.

The size and the dimensions of the intermediate spacer member may differ according to the desired configuration. Purely as an example, the length of the spacer member in the longitudinal direction X may range between 40-70 mm, the diameter may range between 25-45 mm (corresponding to the extension of the spacer member in the transverse direction Y, and direction Z, i.e. the size of a cross-section), while the passages are typically designed and dimensioned in view of the design and dimensions of the elongated strap members. In addition, the extension of the first passage along the longitudinal direction X may range between 40-70 mm, while the extension of the second passage along the longitudinal direction X may range between 20-30 mm.

Moreover the second end 78 may be inclined in order to further improve the fastening of the bundles of the vehicle components. The second sub-end 78a may be inclined differ tan the second sub-end 78*b*. Further example embodiments of the intermediate spacer member that are possible to use in the example embodiment described i relation to FIGS. 3*a*-3*c* are described in FIGS. 5*a*-5*b*.

It should also be appreciated that the intermediate spacer member described in relation to FIGS. 3*a*-3*c* may also be installed and used in the fastening device as described hereinafter in relation to FIGS. 4*a*-4*b*.

FIGS. 4*a* and 4*b* illustrate a second example embodiment according to the present invention in more detail. FIG. 4*a* is a perspective view of the second example embodiment of the fastening device according to the present invention, in which the fastening device is fastened to a vehicle frame, while FIG. 4*b* schematically illustrates a cross sectional view of the second example embodiment of the fastening device in FIG. 4*a* according to the present invention. As shown in FIG. 4*a*, the fastening device 10 is depicted in its assembled configuration to the structural member 80. Except that the through hole configuration of the head member of the second example embodiment comprises a first through hole 26 adapted to receive the first elongated strap member 32 and a second through hole 28 adapted to receive the second elongated strap member 34, the fastening device as described in relation to FIGS. 4*a* and 4*b* includes all functions and features with respect to the example embodiment as described in relation to FIG. 2 and/or FIGS. 3*a*-3*c*.

The example embodiment in FIGS. 4*a* and 4*b* can be mounted in a similar manner as the example embodiment in FIGS. 3*a*-3*c*.

More specifically, FIGS. 4*a* and 4*b* illustrate a fastening device 10 configured for securing the elongated vehicle components 60, 62 to the first side of the vehicle structural member 80, i.e. the inner surface 84 of the vehicle frame. The fastening device 10 comprises the first elongated strap member 32 configured to form a loop around the first bundle of the elongated vehicle components 60. The head member 20 is configured to be positioned on the second side 82 of the vehicle structural member 80, i.e. the outer surface of the vehicle frame, which is opposite the first side. In addition, the head member hole configuration comprises the first through hole 26 adapted to receive the first elongated strap member 32. That is, the first through hole 26 is configured for receipt of two portions of the first elongated strap member 32 forming the loop. The head member is configured to allow tying of the first elongated strap member 32 from the second side 32 of the vehicle structural member 80. That is, the head member is further configured to allow tying of the first elongated strap member 32 from the top side of the head member 22.

Furthermore, the fastening device 10 comprises the second elongated strap member 34 being configured to form a loop around the second bundle of the elongated vehicle components 62. The head member through hole configuration comprises the second through hole 28 adapted to receive the second elongated strap member 34. That is, the second through hole 28 is configured for receipt of two portions of the second elongated strap member forming the loop. Moreover, the head member 20 is configured to allow tying of the second elongated strap member 34 from the second side 82 of the vehicle structural member 80. That is, the head member 20 is configured to allow tying of the second elongated strap member 32 from the top side of the head member 22.

Analogous to the example embodiment in FIGS. 3*a*-3*c*, the head member 20 is thus configured to be forced against the second side 82 of the vehicle structural member 80 when the first elongated strap member 32 and/or the second elongated strap member 34 is tied from the second side 82 of the vehicle structural member 80.

That is, the head member 20 is thus configured to be forced against the second side 82 of the vehicle structural member 80 when the first elongated strap member 32 and/or the second elongated strap member 34 is tied from the top side of the head member 22.

It should be readily appreciated that although the head member as shown in FIGS. 4*a* and 4*b* are forced against the second side by tying both the first elongated strap member 32 and the second elongated strap member 34, the head member can likewise be forced against the second side by tying only the first elongated strap member 32 or only the second elongated strap member 34.

By a configuration according to the example embodiment as shown in FIGS. 4*a*-4*b*, the head member 20 is adapted to abut the outside surface of the structural member when the first elongated strap member 32 and the second elongated strap member 34 are tied from the top side of the head member 22 after being inserted from the top side into the first through hole 26 and the second through hole 28, respectively, and subsequently being inserted back through the first through hole 26 and the second through hole 28.

Thus, besides that the head member 20 has the top side 22, the head member here is defined by an abutment surface 24 for abutting the second side of the vehicle structural member 80. The abutment surface 24 is on an opposite side of the head member 20 in relation to the top side 22.

Moreover, the through hole configuration 26, 27, 28 here extends from the top side 22 to the abutment surface 24. In this way, the configuration allows for tying of the first elongated strap member 32 and the second elongated strap member 34 from the top side 22 of the head member 20.

The configuration, size and shape of the elongated strap members 32 and 34 are similar to the example embodiments described in relation to FIGS. 3*a* through 3*c*.

Typically, the fastening device 10 is fastened to a vehicle frame 80 having a first aperture and a second aperture. However, as may be gleaned from FIG. 4*b*, it would also be possible to a provide vehicle frame having an aperture configuration 87 in the form of a single aperture extending between the outer frame surface and the inner frame surface for receiving the first and second elongated strap members which are associated to the single head member, as described above. Thus, in this type of embodiment, the single aperture is dimensioned to receive both elongated strap members.

FIG. 5*a* illustrates a third example embodiment according to the present invention in more detail, in which the fastening device is fastened to a vehicle frame. As shown in FIG. 5*a*, the fastening device 10 is depicted in its assembled configuration to the structural member 80. Generally, the configuration, features and effects of the head member and the elongated strap members in the third example embodiment are similar to the previous example embodiments described in relation to FIGS. 2, 3*a*-3*c* and 4*a*-4*b*, except that the intermediate spacer member here is provided in a different configuration. Thus, the fastening device as described in relation to FIG. 5 may include all functions and features with respect to the example embodiment as described in relation to FIG. 2, FIGS. 3*a*-3*c*, and/or 4*a*-4*b*, in addition to that a part of the second passage 74 is inclined in relation to the longitudinal direction X. In other words, the intermediate spacer member has opposite first end and second end and a passage configuration comprising a first passage 72 adapted to receive the first elongated strap member 32 and a second through passage 72 adapted to receive said second elongated strap member 34. Typically, the first passage extends between the first end 76 and a second sub-end 78*a*, while the second passage extends between the first end 76 and a second sub-end 78*b*.

The intermediate spacer member 70 is, similar to the examples described in relation to previous figures, adapted to be disposed in-between the vehicle structural member 80 and the plurality of bundles of vehicle components 60, 62.

Thus, as mentioned above, the intermediate spacer member 70 is configured to be positioned on the first side of the vehicle structural member for holding the plurality of elongated vehicle components 60, 62 at a distance from the first side of the vehicle structural member.

In addition, the first passage 72 extends in the longitudinal direction X. The second passage 74 is here spaced apart from the first passage 72, while a part of the second passage 74 is inclined in relation to the longitudinal direction X, as shown in FIG. 5*a*. By being inclined in relation to the longitudinal direction X, an opening of the second passage in the second end is displaced from an opening of the second passage in the first end as seen in a direction perpendicular to the longitudinal direction X. Accordingly, the second passage 74 essentially extends in the longitudinal direction X from the first end 76 to a predetermined distance and thereafter inclined so that the second passage 74 essentially extends in the longitudinal direction X and the transverse direction Y for a predetermined distance until the second end 78*b*. The example embodiment in FIG. 5*a* can be mounted in a similar manner as the example embodiment in FIGS. 3*a*-3*c* and/or FIGS. 4*a*-4*b*.

FIG. 5*b* illustrates a fourth example embodiment according to the present invention in more detail, in which the fastening device is fastened to a vehicle frame. As shown in FIG. 55, the fastening device 10 is depicted in its assembled configuration to the structural member 80. Generally, the configuration, features and effects of the head member and the elongated strap members in the fourth example embodiment are similar to the previous example embodiments described in relation to FIGS. 2, 3*a*-3*c* and 4*a*-4*b*, except that the head member is provided with an additional through hole 29 adapted to receive a third elongated strap member 36 for securing a third bundle of vehicle components 64. In addition, the configuration, features and effects of the intermediate spacer member 70 in the fourth example embodiment is essentially similar to the intermediate spacer member described in relation to FIG. 5*a* except that spacer member here includes another passage for receipt of the third elongated strap member. Thus, the fastening device as described in relation to FIG. 5*b* may include all functions and features with respect to the example embodiments as described in relation to FIG. 2, FIGS. 3*a*-3*c*, 4*a*-4*b*, and/or 5*a* in addition to that the fastening device includes the additional features as described hereinafter.

More specifically, the fourth example embodiment of the fastening device, as illustrated in FIG. 5*b*, comprises a third elongated strap member 36. Thus, the head member 20 is provided with a third through hole 29 extending from the top side 22 to the abutment surface 24. The third through hole 29 is adapted to receive the third elongated strap member 36 for securing a third bundle of vehicle components 64, such that the head member 20 is adapted to abut an outside surface of the frame 80 when the first elongated strap member 32, the second elongated strap member 34 and the third elongated strap member 36 are tied from the top side of the head member 22. Similar to first elongated strap member and the second elongated strap member as described above, the third elongated strap member 36 here has a first free leading end 35 and a second end engagement means 39. The engagement means 39 and the shape and configuration of the third elongated strap member can be design as previously described in relation to the example embodiments in FIGS. 2. 3*a*-3*c*, 4*a*-4*b* and/or 5*a*.

Furthermore, the example embodiment of the intermediate spacer member, as illustrated in FIG. 5*b*, includes a third passage 77 for receipt of the third elongated strap member 36. In other words, the intermediate spacer member has opposite first end and second end and a passage configuration comprising the first passage 72 adapted to receive the first elongated strap member 32 and the second passage 74 adapted to receive the second elongated strap member 34 and the third passage 77 adapted to receive the third elongated strap member 36. Typically, the third passage extends between the first end 76 and a second sub-end 78*c*. The intermediate spacer member 70 is similar to the examples described in relation to previous figures, and therefore also adapted to be disposed in-between the vehicle structural member 80 and the plurality of bundles of vehicle components 60, 62, 64.

Thus, as mentioned above, the intermediate spacer member 70 is configured to be positioned on the first side of the vehicle structural member for holding the plurality of elongated vehicle components 60, 62, 64 at a distance from the first side of the vehicle structural member.

In this example embodiment, the third passage 77 is spaced apart from the first passage 72 and the second passage 74, allowing each opening of each passage at the second end 78 to be displaced from each other. In this manner, each bundle of the vehicle components 60, 62 and 64 can be positioned at different distances from each other. In other words, as shown in FIG. 5*b*, the first passage 72 extends in the longitudinal direction X. The second passage 74 is here spaced apart from the first passage 72, while a part of the second passage 74 is inclined in relation to the longitudinal direction X. Analogously, the third passage 77 is here spaced apart from the first passage 72, while a part of the third passage 77 is inclined in relation to the longitudinal direction X. Typically, the third passage is inclined in an opposite direction to the inclination of the second passage. By being inclined in relation to the longitudinal direction X, an opening of the third passage in the second end is displaced from an opening of the third passage in the first end as seen in a direction perpendicular to the longitudinal direction X. Accordingly, the third passage 77 essentially extends in the longitudinal direction X from the first end 76 to a predetermined distance and thereafter inclined so that the third passage 77 essentially extends in the longitudinal direction X and the transverse direction Y for a predetermined distance until the second end 78*c*. The example embodiment in FIG. 5*b* can be mounted in a similar manner as the example embodiment in FIGS. 3*a*-3*c*, 4*a*-4*b* and or 5*a*.

Figure 6:
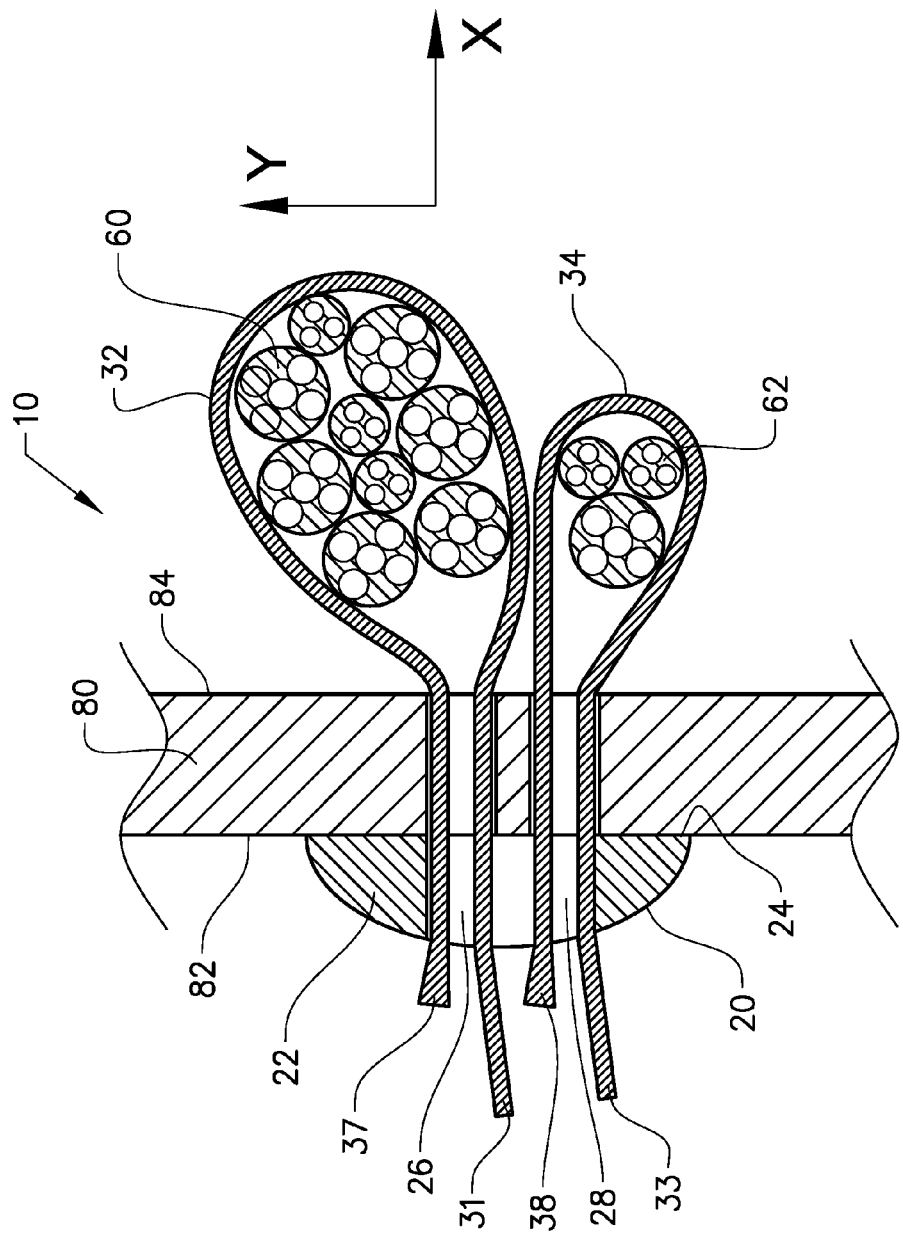
FIG. 6 schematically illustrates a fifth example embodiment of the fastening device according to the present invention, in which the fastening device is fastened to a vehicle frame.

In one example embodiment, as shown in FIG. 6, a fastening device is provided essentially according to the example embodiment described in relation to FIG. 2 and FIGS. 3*a*-3*c*, except that there is no intermediate spacer member installed between the bundles of the vehicle components and the head member. In this manner, the plurality of elongated vehicle components 60, 62 is directly secured to the first side of a vehicle structural member 80 by means of a fastening device including the elongated strap members and the head member, only.

Thus, in brief, the fastening device comprises the first elongated strap member 32 being configured to form a loop around the first bundle of the elongated vehicle components 60. In addition, the fastening device comprises the head member 20 being configured to be positioned on a second side of the vehicle structural member 80 opposite the first side. The head member 20 is provided with the through hole configuration 26, 27, 28 for receipt of two portions of the first elongated strap member 32 forming the loop and configured to allow tying of the first elongated strap member 32 from the second side 82 of the vehicle structural member 80. That is, the head member 20 is provided with the through hole configuration 26, 27, 28 for receipt of two portions of the first elongated strap member 32 forming the loop and configured to allow tying of the first elongated strap member 32 from a top side of the head member 22.

Moreover, the fastening device 10 comprises the second elongated strap member 34 being configured to form a loop around the second bundle of the elongated vehicle components 62. Also, the head member through hole configuration 26, 27, 28 being configured for receipt of two portions of the second elongated strap member forming the loop, and the head member 20 being configured to allow tying of the second elongated strap member 34 from the second side 82 of the vehicle structural member 80. That is, the head member through hole configuration 26, 27, 28 being configured for receipt of two portions of the second elongated strap member forming the loop, and the head member 20 being configured to allow tying of the second elongated strap member 34 from the top side of the head member 22.

The fastening device as described in relation to FIG. 6 may include similar functions and features as described with respect to the example embodiment in FIG. 2 and/or FIGS. 3a-3c. The example embodiment in FIG. 6 may be mounted in a similar manner as the example embodiment in FIGS. 3a-3c, except that no intermediate spacer member is installed or mounted.

FIG. 7a schematically illustrates an assembly sequence of an assembler, in which the assembler 95 is mounting a fastening device 10 and a set of elongated vehicle components to a vehicle frame 80 according to a prior art solution. In this prior art solution, at least one of the secondary cable ties are mounted and tensioned from the inside 84 of the vehicle frame, i.e. the first side of the vehicle frame. As illustrated in FIG. 7a, the assembler 95 is required to reach over the vehicle frame in order to tension the cable ties from the inside of the frame typically leading to wrist pain or the like. This type of motion of the assembler may give injury to the assembler considering that the assembler is mounting a vast amount of fastening devices during a work shift.

On the other hand, FIG. 7b schematically illustrates an assembly sequence of an assembler, in which the assembler is mounting a fastening device and a set of elongated vehicle components to a vehicle frame according to any one of the example embodiments of the present invention described herein and in other example embodiments derivable from the description. As may gleaned from FIG. 7b, the tensioning of the fastening device 10 to form a vehicle frame assembly 100 is made by the assembler 95 from the outside of the frame, i.e. from the second side 82 of the vehicle frame. More specifically, due to that all elongated strap members of the example embodiments are tensioned from the top side of the head member, corresponding to the outer side of the vehicle frame, the assembler is able to maintain a relaxed assembly position during the operation. In addition, the assembler is not subjected to any exhausting arms-bend and/or wrist-bend during the assembly sequence.

Thanks to the present invention, it is therefore possible to assemble and fasten several adjacent bundles of vehicle components (cables) in a fast and ergonomic manner. The present invention is typically applicably to a so-called up-side down assembly of a vehicle frame. In addition, a fastening device can be provided according to any one of the example embodiments described herein, which is capable of securing a plurality of bundles of vehicle components to an inner side of a vehicle frame by means of one single head member. To this end, the fastening device may contribute to a simple assembly sequence without increasing the total weight of the fastening device since it is no longer needed to use one bead member to each strap member. Rather, several elongated strap members can be engaged to one single head member while enabling each one of them to be tied from the top side of the head member typically corresponding to the second side of the vehicle structural member, i.e. from the outside of the structural member (vehicle frame).

Figure 8:
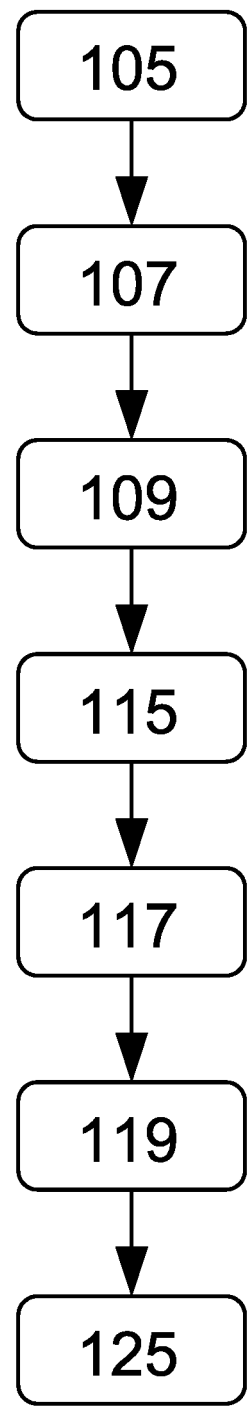
FIG. 8 is a flowchart of a method of securing a plurality of elongated vehicle components to a first side of a vehicle structural member according to the present invention.

The example embodiments as described in relation to the Figures herein can be mounted in several different ways to a vehicle structural member such as the vehicle frame. A flowchart of one example embodiment of a method of securing a plurality of elongated vehicle components to the first side of the vehicle structural member is shown in FIG. 8 according to the present invention. In general, the method of securing a plurality of elongated vehicle components to the first side of the vehicle structural member is carried out with the fastening device comprising the first elongated strap member 32 configured to form a loop around the first bundle of the elongated vehicle components 60, the second elongated strap member 34 configured to form a loop around the second bundle of the elongated vehicle components 62, and the head member 20 configured to be positioned on the second side of the vehicle structural member 80 opposite the first side, wherein the head member 20 is provided with the through hole configuration 26, 27, 28 for receipt of two portions of the first elongated strap member 32 forming the loop and two portions of the second elongated strap member 34 forming the loop.

The method comprises the steps of: —inserting 105 a leading free end of the first elongated strap member into the through hole configuration of the head member and further into an aperture configuration of the structural frame; —encircling 107 the first elongated strap member about the first bundle of elongated vehicle components and further inserting 109 the leading free end of the first elongated strap member back through the aperture configuration of the structural frame and the through hole configuration of the head member until at least a part of the leading free end of the first elongated strap member is located outside the second side of the vehicle structural member (and outside the top side of the head member); —inserting 115 a leading free end of the second elongated strap member into the through hole configuration of the head member and further into an aperture configuration of the structural frame; —encircling 117 the second elongated strap member about the second bundle of elongated vehicle components and further inserting 119 the leading free end of the second elongated strap member back through the aperture configuration of the structural frame and the through hole configuration of the head member until at least a part of the leading free end of the second elongated strap member is located outside the second side of the vehicle structural member (and outside the top side of the head member); —and securing 125 the fastening device to the vehicle structural member by tying (tensioning) first elongated strap member and the second elongated strap member from an opposite side of the head member (i.e. the top side) relative to the vehicle structural member until the head member abuts the second side of the vehicle structural member.

Typically, although not strictly required, the leading free end of the first elongated strap member and the leading free end of the second elongated strap member are inserted simultaneously into the through bole configuration.

In an example embodiment when the fastening device includes an intermediate spacer member, as described herein, the method typically comprises the step of inserting the first elongated strap member and the second elongated strap member through the first passage and the second passage of the intermediate spacer member, respectively. Thereafter, the step of encircling 107 the first elongated strap member about the first bundle of elongated vehicle components and encircling 117 the second elongated strap member about the second bundle of elongated vehicle components are performed followed by inserting the first elongated strap member and the second elongated strap member through the first passage and the second passage of the intermediate spacer member etc.

By securing the fastening device to the vehicle structural member by tying (tensioning) the first elongated strap member and the second elongated strap member from an opposite side (i.e. the top side) relative to the vehicle structural member until the head member abuts the second side of the vehicle structural member, it becomes possible to set the fastening device in an assembled configuration so that the plurality of the vehicle components is secured to the inner surface of the vehicle frame. Thus, the step of tying refers to a configuration when the fastening device is in an assembled configuration, i.e. when the abutment surface abuts the second side of the vehicle frame member. In some example embodiments, this refer to a configuration when the elongated strap members are engaged with the head member, as described above with respect to the engagement means.

It is to be understood that the present invention is not limited to the embodiments described above and illustrated in the drawings; rather, the skilled person will recognize that many changes and modifications may be made within the scope of the appended claims.

The invention claimed is:

1. A fastening device for securing a plurality of elongated vehicle components to a first side of a vehicle structural member, the fastening device comprising a first elongated strap member configured to form a loop around a first bundle of the elongated vehicle components, a head member configured to be positioned on a second side of the vehicle structural member opposite the first side, wherein the head member is provided with a through hole configuration for receipt of two portions of the first elongated strap member forming the loop and configured to allow tying of the first elongated strap member from the second side of the vehicle structural member, wherein the fastening device comprises a second elongated strap member configured to form a loop around a second bundle of the elongated vehicle components, that the head member through hole configuration is configured for receipt of two portions of the second elongated strap member forming the loop, and that the head member is configured to allow tying of the second elongated strap member from the second side of the vehicle structural member.

2. The fastening device according to claim 1, wherein the head member is configured to be forced against the second side of the vehicle structural member when the first elongated strap member and/or the second elongated strap member is tied from the second side of the vehicle structural member.

3. The fastening device according to claim 1, wherein the head member has a top side and an abutment surface for abutting the second side of the vehicle structural member, which abutment surface is on an opposite side of the head member in relation to the top side, and wherein the through hole configuration extends from the top side to the abutment surface for allow tying of the first elongated strap member and the second elongated strap member from the top side of the head member.

4. The fastening device according to claim 1, wherein the head member hole configuration comprises a first through hole adapted to receive the first elongated strap member and a second through hole adapted to receive the second elongated strap member.

5. The fastening device according to claim 1, further comprising an intermediate spacer member having opposite first end and second end and a passage configuration extending therebetween for receiving at least one of the first and second elongated strap members, wherein the intermediate spacer member is adapted to be disposed in-between the vehicle structural member and the plurality of bundles of vehicle components.

6. The fastening device according to claim 5, wherein the intermediate spacer member hole configuration comprises a first passage adapted to receive the first elongated strap member and a second passage adapted to receive the second elongated strap member.

7. The fastening device according to claim 6, wherein at least one passage of the first and second passages of the intermediate spacer member extending in at least a longitudinal direction.

8. The fastening device according to claim 7, wherein a part of the at least one passage of the intermediate spacer member is inclined in relation to the longitudinal direction such that an opening of the passage in the second end is displaced from an opening of the passage in the first end as seen in a direction perpendicular to the longitudinal direction.

9. The fastening device according to claim 7, wherein the at least one passage of the intermediate spacer member extending in at least the longitudinal direction is the first passage, and wherein the second passage is spaced apart from the first passage and extends in at least the longitudinal direction.

10. The fastening device according to claim 7, wherein the at least one passage of the intermediate spacer member extending in at least the longitudinal direction is the first passage, and wherein the second passage is spaced apart from the first passage, while a part of the second passage is inclined in relation to the longitudinal direction.

11. The fastening device according to claim 9, wherein the intermediate spacer member further includes a third passage spaced apart from the first passage and the second passage, allowing each opening of each passage at the second end to be displaced from each other.

12. The fastening device according to claim 1, wherein the head member is a button-head member.

13. The fastening device according to claim 1, wherein the head member is formed separately and independently from the first and second elongated strap members.

14. The fastening device according to claim 1, wherein the fastening device comprises a third elongated strap member configured to form a loop around a third bundle of the elongated vehicle components (64), and the head member is provided with a third through hole adapted to receive the third elongated strap member forming the loop, such that the head member is adapted to abut the second side of the structural member when the first elongated strap member, the second elongated strap member and/or the third elongated strap member are tied from the second side of the vehicle structural member.

15. The fastening device according to claim 1, wherein any one of the first and second elongated strap members is provided with a first free leading end and a second end having engagement means for engaging with the head member.

16. A vehicle frame assembly (100) wherein the vehicle frame assembly comprises a fastening device according to claim 1 and a vehicle frame having an outer frame surface and an inner frame surface (84), wherein a region of the frame is provided with an aperture configuration extending between the outer frame surface and the inner frame surface for receiving the elongated strap members.

17. A vehicle comprising a vehicle frame assembly according to claim 16.

18. A method of securing a plurality of elongated vehicle components to a first side of a vehicle structural member with a fastening device comprising a first elongated strap member configured to form a loop around a first bundle of the elongated vehicle components, a second elongated strap member configured to form a loop around a second bundle of the elongated vehicle components, and a head member configured to be positioned on a second side of the vehicle structural member opposite the first side, wherein the head member is provided with a through hole configuration for receipt of two portions of the first elongated strap member forming the loop and two portions of the second elongated strap member forming the loop, the method comprising:

inserting a leading free end of the first elongated strap member into the through hole configuration of the head member and further into an aperture configuration of the structural member;

encircling the first elongated strap member about the first bundle of elongated vehicle components and further inserting the leading free end of the first elongated strap member back through the aperture configuration of the structural member and the through hole configuration of the head member until at least a part of the leading free end of the first elongated strap member is located outside the second side of the vehicle structural member; inserting a leading free end of the second elongated strap member into the through hole configuration of the head member and further into the aperture configuration of the structural member;

encircling the second elongated strap member about the second bundle of elongated vehicle components and further inserting the leading free end of the second elongated strap member back through the aperture configuration of the structural member and the through hole configuration of the head member until at least a part of the leading free end of the second elongated strap member is located outside the second side of the vehicle structural member; and securing the fastening device to the vehicle structural member by tying the first elongated strap member and/or the second elongated strap member from an opposite side of the head member relative to the vehicle structural member until the head member abuts the second side of the vehicle structural member.

* * * * *